United States Patent Office 3,702,890

Patented Nov. 14, 1972

1

3,702,890
METHODS OF COMBATTING INSECTS, FUNGI OR NEMATODES USING PHOSPHONO THIOESTER AMIDATES

Paul C. Aichenegg, Prairie Village, Kans., assignor to Chemagro Corporation, Kansas City, Mo.

No Drawing. Application Dec. 31, 1969, Ser. No. 889,688, which is a continuation-in-part of application Ser. No. 620,664, Mar. 6, 1967, now Patent No. 3,489,825, dated Jan. 13, 1970. Divided and this application Nov. 5, 1971, Ser. No. 196,183
Int. Cl. A01n 9/36
U.S. Cl. 424—220 9 Claims

ABSTRACT OF THE DISCLOSURE

Compounds are prepared having the formula

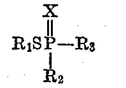

where $R_1$ is trichloroethyl or dichlorovinyl, $R_2$ is lower alkyl or phenyl, $R_3$ is $OR_4$ or $SR_4$ or

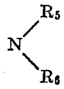

where $R_4$ is alkyl, aryl, haloalkyl or haloaryl, $R_5$ and X is O or S. Preferably $R_4$ and $R_5$ are lower alkyl and $R_6$ is H or lower alkyl. The compounds are useful as nematocides, fungicides, and insecticides. Preferably $R_1$ is 2,2,2-trichloroethyl or 2,2-dichlorovinyl.

This is a division of application Ser. No. 889,688 filed Dec. 31, 1969 which is a continuation-in-part of application Ser. No. 620,664, filed Mar. 6, 1967, and now Pat. No. 3,489,825 of Jan. 13, 1970. The entire disclosure of the parent application is hereby incorporated by reference.

The present invention relates to the preparation of novel phosphonates thiophosphonates, phosphonamidates and thiophosphonamidates.

It is an object of the present invention to prepare novel phosphonates, thiophosphonates, phosphonamidates and thiophosphonamidates.

Another object is to kill nematodes.

An additional object is to kill fungi.

A further object is to kill insects.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by preparing compounds having the formula

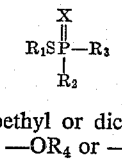

where $R_1$ is trichloroethyl or dichlorovinyl, $R_2$ is lower alkyl or phenyl, $R_3$ is $—OR_4$ or $—SR_4$ or

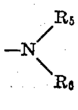

2 where $R_4$ is alkyl, aryl, haloalkyl or haloaryl, $R_5$ is alkyl, aryl or haloaryl and $R_6$ is hydrogen or $R_5$ and X is O or S. Preferably $R_4$ and $R_5$ are lower alkyl, e.g. 1–8 carbon atoms and most preferably not over 4 carbon atoms, and $R_6$ is H or lower alkyl (as for $R_4$ and $R_5$). If a halogen is present on $R_4$, $R_5$ or $R_6$ it is preferably chlorine but can be bromine or fluorine. Preferably $R_1$ is 2,2,2-trichloroethyl or 2,2-dichlorovinyl.

The compounds of the invention are useful as nematocides, fungicides and insecticides. The activity of the compounds for the several uses varies to a considerable extent depending upon both the compound and its intended use. Because of their relatively low phytotoxicity, they are very useful as agricultural pesticides.

The compounds of the present invention are conveniently prepared by the following reaction:

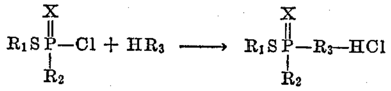

I II III

The compounds of Formula I include S-2,2,2-trichloroethyl methyl phosphonyl chloride (CP 12), S-2,2,2-trichloroethyl ethyl phosphonyl chloride (CP 22), S-2,2,2-trichloroethyl propyl phosphonyl chloride, S-2,2,2-trichloroethyl butyl phosphonyl chloride, S-2,2,2-trichloroethyl isobutyl phosphonyl chloride, S - 1,2,2 - trichloroethyl methyl phosphonyl chloride, S-1,2,2-trichloroethyl ethyl phosphonyl chloride, S-2,2,2-trichloroethyl phenyl phosphonyl chloride (CP 8), S-1,2,2-trichloroethyl phenyl phosphonyl chloride, S-2,2-dichlorovinyl methyl phosphonyl chloride (CP 14), S-2,2-dichlorovinyl ethyl phosphonyl chloride (CP 23), S-2,2-dichlorovinyl propyl phosphonyl chloride, S-2,2-dichlorovinyl isopropyl phosphonyl chloride, S-2,2-dichlorovinyl butyl phosphonyl chloride, S-2,2-dichlorovinyl phenyl phosphonyl chloride (CP 10), S-2,2,2-trichloroethyl methyl thiophosphonyl chloride (CP 16), S-2,2,2-trichloroethyl ethyl thiophosphonyl chloride (CP 32), S-2,2,2-trichloroethyl propyl thiophosphonyl chloride, S-2,2,2-trichloroethyl butyl thiophosphonyl chloride, S-2,2,2-trichloroethyl phenyl thiophosphonyl chloride (CP 9), S-1,2,2-trichloroethyl methyl thiophosphonyl chloride, S-1,2,2-trichloroethyl ethyl thiophosphonyl chloride, S-1,2,2-trichloroethyl thiophosphonyl chloride, S-2,2-dichlorovinyl methyl thiophosphonyl chloride (CP 15), S-2,2-dichlorovinyl ethyl thiophosphonyl chloride (CP 33), S-2,2-dichlorovinyl propyl thiophosphonyl chloride, S-2,2-dichlorovinyl butyl thiophosphonyl chloride, S-2,2-dichlorovinyl phenyl thiophosphonyl chloride (CP 11).

As compounds of Formula II for reaction with compounds of Formula I there can be used alcohols such as methyl alcohol, ethyl alcohol, propyl alcohol, isopropyl alcohol, butyl alcohol, octyl alcohol, sec. octyl alcohol, isooctyl alcohol, amyl alcohol, 2,2,2-trichloroethyl alcohol, ethylene chlorohydrin, propylene chlorohydrin, trimethylene chlorohydrin, 1,2-dichloro-2-propanol, ethylene bromohydrin, allyl alcohol, or phenols (preferably in the form of their sodium salts), e.g. phenol per se, p-cresol, m-cresol, o-cresol, p-ethyl phenol, 2-chlorophenol, 4-chlorophenol, 2,4-dichlorophenol, p-t-butyl phenol, p-octylphenol, 2-methyl-4-chlorophenol, 2,4,5-trichlorophenol, p-butylphenol, or mercaptans, e.g. methyl mercaptan, isopropyl mercaptan, ethyl mercaptan, propyl mercaptan, butyl mercaptan, sec. butyl mercaptan, thiophenol, p-t-butyl thiophenol, amyl mercaptan, octyl mercaptan, 2,4,5-trichlorothiophenol, 2-methyl-4-chlorothiophenol; or primary or secondary amines, e.g., methyl amine, ethyl amine, isopropyl amine, propyl amine, butyl amine, isobutyl amine, amyl amine, hexyl amine, cyclohexyl amine, piperidine, pyrrolidine, octyl amine, dimethyl amine, diethyl amine, dipropyl amine, dibutyl amine, diamyl amine, diisopropyl amine, aziridine (ethylene imine), dioctyl amine, diisobutyl amine, aniline, N-methylaniline, N-ethyl aniline, m-chloro aniline, α-naphthyl amine, β-naphthyl amine, p-bromoaniline, N-butyl aniline, o-toluidine, p-toluidine, p-chloroaniline, O-chloroaniline.

Examples of compounds within the present invention are S-2,2,2-trichloroethyl O-butyl methyl phosphonate, S-2,2,2-trichloroethyl-O-butyl thiophosphonate, S-2,2,2-trichloroethyl O-amyl ethyl phosphonate, S-2,2,2-trichloroethyl-O-amyl thiophosphonate, S-2,2,2-trichloroethyl O-octyl methyl phosphonate, S-2,2,2-trichloroethyl O-octyl ethyl thiophosphonate, S-2,2,2-trichloroethyl O-butyl butyl phosphonate, S-2,2,2-trichloroethyl O-hexyl butyl thiophosphonate, S,S-dichlorovinyl O-butyl methyl phosphonate, S,S-dichlorovinyl O-octyl ethyl thiophosphonate, S-1,2,2-trichloroethyl O-ethyl methyl phosphonate, S-1,2,2-trichloroethyl O-methyl ethyl thiophosphonate, S-2,2,2-trichloroethyl O-2-chloroethyl methyl thiophosphonate, S-2,2,2-trichloroethyl O-2-bromoethyl ethyl ethyl phosphonate, S-2,2,2-trichloroethyl-O-phenyl methyl phosphonate, S-2,2,2-trichloroethyl-O-phenyl ethyl thiophosphonate, S-2,2-dichlorovinyl-O-phenyl ethyl phosphonate, S-2,2-dichlorovinyl-O-phenyl methyl thiophosphonate, S-2,2-dichlorovinyl-O-phenyl phenyl phosphonate, S-2,2,2-trichloroethyl-O-p-cresyl methyl phosphonate, S-2,2,2-trichloroethyl O-m-cresyl ethyl thiophosphonate, S-2,2-dichlorovinyl O-o-cresyl ethyl thiophosphonate, S-2,2,2-trichloroethyl-S-methyl methyl phosphonate, S-2,2,2-trichloroethyl-S-ethyl methyl thiophosphonate, S-2,2-dichlorovinyl-S-butyl ethyl phosphonate, S-2,2-dichlorovinyl-S-octyl methyl thiophosphonate, S-2,2,2-trichloroethyl-S-phenyl ethyl phosphonate, S-2,2,2-trichloroethyl methyl phosphon mono octyl amidate, S-2,2,2-trichloroethyl ethyl phosphon dioctyl amidate, S-2,2-dichlorovinyl methyl phosphon mono butyl amidate, S-2,2,2-trichloroethyl ethyl thiophosphon diheptyl amidate, S-2,2-dichlorovinyl methyl thiophosphon mono butyl amidate, S-2,2,2-trichloroethyl ethyl phosphon mono phenyl amidate, S-2,2-dichlorovinyl methyl phosphon mono alpha naphthyl amidate, S-2,2,2-trichloroethyl methyl thiophosphon diphenyl amidate, S-2,2-dichlorovinyl ethyl phosphon p-chlorophenyl amidate. Additional compounds within the invention are set forth in the working examples.

In the working examples the compounds of Formula I are indicated by the appropriate CP numbers as set forth supra.

Unless otherwise indicated, all parts and percentages are by weight.

Specific examples of the preparation of such derivatives are set forth below.

EXAMPLE 1

6.1 grams (0.023 mole) of CP 12 were dissolved in 60 ml. of Skellysolve B-benzene (1:5 by volume). 38 grams (0.023 mole) of 2,4-dichlorophenol in 20 ml. of benzene were added and the reaction was effected by dropwise addition of 2.3 grams (0.023 mole) of triethylamine in 10 ml. of Skellysolve B with stirring and cooling at a temperature not to exceed 35° C. 1.5 hours warming at 50° C., cooling, washing in succession with dilute hydrochloric acid, dilute aqueous sodium bicarbonate and water, drying over anhydrous magnesium sulfate and high vacuum stripping gave 8.8 grams (98% yield) of crude S-2,2,2-trichloroethyl-O 2,4-dichlorophenyl methyl phosphonate (Compound 6702) as a buff colored solid which after a short wash with Skellysolve B gave white crystals, M.P. 86° C.; Cl, 44.7% (Theory 45.6%); S, 8.3% (Theory 8.25%); P, 7.9% (Theory 7.9%).

Skellysolve B is an aliphatic hydrocarbon solvent boiling in the hexane range.

EXAMPLE 2

11.05 grams (0.04 mole) of CP 22 were diluted with 100 ml. of dry chloroform and 4.2 grams (0.08 mole) of monoisopropyl amine in 10 ml. of chloroform were added dropwise with stirring and cooling at 5–10° C. After completed addition the whole mixture was allowed to stir at room temperature overnight. Washing with dilute HCl, dilute $NaHCO_3$ and water, drying over anhydrous $MgSO_4$ and stripping off of the chloroform gave 11.5 grams (96.5% yield) of S-2,2,2-trichloroethyl ethyl phosphon-monoisopropyl amidate (Compound 7835) as a light amber viscous oil, $n_D^{23}$ 1.5213.

EXAMPLE 3

9.7 grams (0.03 mole) of CP 8 in 10 ml. of Skellysolve B were added to 3 grams (i.e. a large excess) of ethyl mercaptan in 50 ml. of Skellysolve B. 3.0 grams of triethylamine (0.03 mole) in 10 ml. of Skellysolve B were then added dropwise with stirring at below 35° C. over a period of 20 minutes. Stirring at room temperature for 2 further hours, washing the mixture with dilute HCl, dilute $NaHCO_3$, and water, drying of the organic layer over $MgSO_4$ and stripping gave 10.0 grams (95% yield) of S-2,2,2-trichloroethyl-S-ethyl phosphonate (Compound 6645) as an almost colorless and odorless viscous oil, $n_D^{20}$ 1.5992; Cl 30.2% (Theory 30.5%), P 8.7% (Theory 8.9%).

EXAMPLE 4

11.1 grams (0.04 mole) of CP 16 were dissolved in 100 ml. of chloroform and 4.8 grams (0.08 mole) of monoisopropyl amine in 10 ml. of chloroform were added dropwise with stirring at 5–10° C. with cooling. The mixture was allowed to warm to room temperature and stand overnight. Washing of the chloroform solution with dilute HCl, dilute $NaHCO_3$ and water, drying over anhydrous $MgSO_4$ and stripping of the organic solutions gave 11.5 grams (96% yield) of S-2,2,2-trichloroethyl methyl thiophosphon-monoisopropyl amidate (Compound 7836) as an almost colorless, very viscous oil, $n_D^{23}$ 1.5747.

EXAMPLE 5

11.7 grams (0.04 mole) of CP 32 were dissolved in 100 ml. of chloroform and a solution of 4.8 grams of monoisopropyl amine in 10 ml. of chloroform was added dropwise with stirring at 5–10° C. with occasional cooling. Additional slow stirring overnight at room temperature, washing of the resulting mixture in succession with dilute HCl, dilute $NaHCO_3$ and water, drying over anhydrous magnesium sulfate and stripping gave a 90% yield of S-2,2,2-trichloroethyl ethyl thiophosphon monoisopropyl amidate as a viscous, colorless oil, $n_D^{24}$ 1.5684 (Compound 7837).

EXAMPLE 6

10.2 grams of CP 9 (0.03 mole) were diluted with 50 ml. of benzene and 2 grams (a slight excess) of ethyl alcohol were added. 3 grams (0.03 mole) of triethyl amine in 10 ml. of benzene were added with stirring and cooling at room temperature in order to complete the reaction. Standing overnight and working up by washing with dilute HCl, dilute $NaHCO_3$ and water, drying over $MgSO_4$ and high vacuum stripping gave 9.7 grams (93% yield) of S-2,2,2-trichloroethyl -O- ethyl phenyl thiophosphonate (Compound 7823) as a yellow oil, $n_D^{23}$ 1.6030.

EXAMPLE 7

13.55 grams (0.06 mole) of CP 14 dissolved in 100 ml. of petroleum ether were reacted with 7.2 grams (0.12 mole) of monoisopropyl amine at room temperature. (The temperature did not exceed 30° C.) 50 ml. of benzene were added to make the product soluble in the organic layer. Washing with dilute HCl, dilute $NaHCO_3$ and water, drying over $MgSO_4$ and stripping gave 10 grams (67% yield) of S-2,2-dichlorovinyl methyl phosphon monoisopropyl amidate (Compound 7587) as an amber, viscous oil, $n_D^{22}$ 1.5486.

EXAMPLE 8

To 10 grams (0.042 mole) of CP 23 in 50 ml. of dry chloroform there were added 3 grams (0.042 mole+0.5 gram excess) of ethyl mercaptan at 0–5° C. followed by dropwise addition of 4.25 grams (0.042 mole) of triethylamine in 20 ml. of chloroform with cooling and stirring. Stirring at room temperature for 3 hours, washing with dilute HCl, dilute $NaHCO_3$ and water and drying over $MgSO_4$ gave after high vacuum stripping 9.9 grams (89% yield) of S-2,2-dichlorovinyl S-ethyl phosphonate (Compound 7502) as a light viscous oil, $n_D^{23}$ 1.5756.

EXAMPLE 9

To 8.61 grams (0.03 mole) of CP 10 in 100 ml. of petroleum ether stirred and cooled to 10–15° C. there were added 3.0 grams (about a 10% excess) of dimethylamine at a moderate rate at a temperature of not over 15° C. Finally the whole mixture was stirred for 30 minutes at room temperature. Addition of 50 ml. of benzene to dissolve all of the product formed, washing with dilute HCl, dilute $NaHCO_3$ and water, drying over $MgSO_4$ and stripping of the organic layer gave 7.5 grams (85% yield) of S-2,2-dichlorovinyl phenyl phosphono N,N-dimethyl amidate (Compound 6707) as a brown oil, $n_D^{23}$ 1.5942.

EXAMPLE 10

To 9.5 grams (0.039 mole) of CP 15 in 100 ml. of chloroform there were added with stirring and cooling at 15–20° C. a solution of 4.64 grams of monoisopropyl amine in 10 ml. of chloroform. Stirring at room temperature for 2 more hours, washing with dilute HCl, dilute $NaHCO_3$ and water, drying over anhydrous $MgSO_4$ and high vacuum stripping gave 9.8 grams (94% yield) of S-2,2-dichlorovinyl methyl thiophosphon-N-monoisopropyl amidate (Compound 7590) as an amber oil, $n_D^{22}$ 1.5882, Cl 27.2% (Theory 26.8%), P 11.4% (Theory 11.7%), S 23.3% (Theory 24.2%).

EXAMPLE 11

9.5 grams (0.037 mole) of CP 33 in 100 ml. of chloroform was reacted with 4.4 grams of monoisopropyl amine (an excess) in 10 ml. of chloroform by dropwise addition of the amine solution with stirring at 5–10° C. with cooling. The mixture was warmed for 30 further minutes at 45–50° C. Washing when cooled to room temperature with dilute HCl, dilute $NaHCO_3$ and water, drying over $MgSO_4$ and high vacuum stripping gave 10 grams (97% yield) of S-2,2-dichlorovinyl ethyl thiophosphon-N-monoisopropyl amidate (Compound 7592) as an amber oil, $n_D^{24}$ 1.5807.

EXAMPLE 12

To 12 grams (0.039 mole) of CP 11 in 100 ml. of carbon tetrachloride there were added 3 grams (an excess) of ethyl mercaptan followed by dropwise addition with stirring and cooling of 4 grams (the calculated amount) of triethylamine at 25–30° C. Further stirring at room temperature overnight, washing with dilute HCl, dilute $NaHCO_3$ and water, drying over $MgSO_4$ and stripping gave 11 grams (85% yield) of S-2,2-dichlorovinyl - S - ethyl - phenyl - thiophosphonate (Compound 7830) as a light yellow oil, $n_D^{22}$ 1.6634.

EXAMPLE 13

10 grams (0.382 mole) of CP 12 were diluted with 75 ml. of benzene and 2.5 grams (0.4 mole, slight excess) of ethyl mercaptan were added at room temperature followed by dropwise addition with stirring of 3.9 grams (0.28 moles) of triethylamine at such a rate (occasional cooling) that the temperature was continued for 2.5 hours and the whole was allowed to stand overnight with stirring. Filtration, washing of the clear benzene solution with dilute HCl and dilute bicarbonate, drying over magnesium sulfate and high vacuum stripping gave 9.5 grams (87% yield) of S-2,2,2-trichloroethyl-S-ethyl-methylphosphonate as light yellow oil, $n_D^{28}$ 1.5621.

EXAMPLE 14

10 grams (0.38 mole) of CP 12 were diluted with 75 ml. of benzene, 1.9 grams ethanol (0.4 mole, slight excess) added at once at room temperature followed by dropwise addition with stirring of 3.9 grams (0.38 mole) of triethylamine at a temperature not to exceed 25° C. Standing overnight at room temperature and washing as described in Example 13 followed by high vacuum stripping gave 9 grams (87% yield) of S-2,2,2-trichloroethyl-O-ethyl-methylphosphonate as reddish oil, $n_D^{27}$ 1.5148.

EXAMPLE 15

10.5 grams (0.4 mole) of CP 12 were diluted with 100 ml. of chloroform and reacted with a total of 4.8 grams (0.8 mole) of isopropylamine by dropwise addition with stirring and cooling at a temperature of between 10° and 20° C. After completed addition of the reagent the mixture was allowed to stir for a further ½ hour at room temperature followed by standing overnight. After a brief warming period to 50° C. next day (15 minutes) and cooling, the mixture was washed in succession with water, dilute HCl and dilute bicarbonate, dried over anhydrous magnesium sulfate and stripped in high vacuum. 11 grams (97% yield) of compound S-2,2,2-trichloroethyl-methylphosphon-monoisopropylamidate were thus obtained as reddish oil, $n_D^{23}$ 1.5196.

EXAMPLE 16

8 grams (0.3 mole) of CP 12 were diluted with 150 ml. of benzene at room temperature and 7.1 grams (0.7 mole) di-isopropylamine were added dropwise with stirring allowing the temperature to rise to 35° C. Stirring was continued at room temperature for approximately 3 hours and the whole was allowed to stand overnight at room temperature. The following day the mixture was washed in succession with dilute HCl, dilute bicarbonate, dried over anhydrous magnesium sulfate, and high vacuumed stripped. 1.5 grams (12.8% yield) of S-2,2,2-trichloroethyl-methylphosphon - N,N - di-isopropylamidate were obtained as brownish oil, $n_D^{28}$ 1.5432.

EXAMPLE 17

10 grams (0.445 mole) of CP 14 were diluted with 100 ml. of benzene and 2.3 grams (0.5 mole) of dry ethyl alcohol added at room temperature. To this solution there were added slowly with stirring and occasional cooling 4.5 grams (0.0445 mole) of triethylamine dropwise with stirring at such a rate that the temperature did not exceed 25° C. After completed addition of the reagent, stirring was continued for a further 2½ hours and the whole was allowed to stand overnight at room temperature. Washing the mixture with dilute HCl, dilute bicarbonate, drying the solution over anhydrous magnesium sulfate and high vacuum stripping gave 9 grams (86% yield) of S-2,2-dichlorovinyl-O-ethyl-methylphosphonate as amber oil.

EXAMPLE 18

13.55 grams (0.6 mole) of CP 14 were diluted with 100 ml. of dry chloroform and 3.72 grams (slight excess) of ethyl mercaptan were added at room temperature at once. 6.06 grams (0.6 mole) of triethylamine were then added dropwise with stirring and cooling at a rate that the temperature remained below 25° C. Allowing the mixture to stand overnight, washing with dilute HCl, sodium bicarbonate, drying anhydrous magnesium sulfate and high vacuum stripping gave 12.4 grams (83% yield) of S-2,2-dichlorovinyl-S-ethyl-methylphosphonate as almost colorless oil, $n_D^{22}$ 1.5616.

EXAMPLE 19

10 grams (0.445 mole) of CP 14 were diluted with 100 ml. of benzene and 10.1 grams (0.1 mole) of dilute isopropylamine were added dropwise with stirring and cooling at such a rate as to keep the temperature below 25° C. After completed addition, stirring was continued at room temperature for 4 hours. After standing the mixture overnight at room temperature, heating to 50° for 30 minutes was applied followed by cooling. The mixture was then washed as usual with dilute HCl and bicarbonate solution, dried over anhydrous magnesium sulfate and high vacuum stripped. 2 grams (15% yield) of S-2,2-dichlorovinyl - methylphosphon-N,N-di-isopropylamidate were obtained as red oil, $n_D^{23}$ 1.5590.

EXAMPLE 20

10 grams (0.036 mole) of CP 16 were diluted with 75 ml. of dry benzene and 1.48 grams (0.04 mole) of dry ethanol were added at room temperature. 3.64 grams of triethylamine (0.036 mole) were then added dropwise with stirring and cooling at a temperature below 25° C. Stirring was then continued for 2 further hours at room temperature and the whole was allowed to stand overnight. Washing the mixture with dilute HCl, dilute bicarbonate, drying over magnesium sulfate and high vacuum stripping gave 9 grams (87% yield) of S-2,2,2-trichloroethyl-O - ethyl - methylthioprosphonate as yellowish oil, $n_D^{28}$ 1.5644.

EXAMPLE 21

10 grams (0.036 mole) of CP 16 were diluted with 75 ml. of benzene and 2.48 grams (0.04 mole) of ethyl mercaptan added at room temperature. 3.64 grams of triethylamine (0.036 mole) were then added slowly with stirring and cooling at a temperature not to exceed 25° C. After the addition of the triethylamine, stirring was continued for a further 2 hours and the mixture was allowed to stand overnight. Washing in order with dilute HCl, dilute bicarbonate, drying over magnesium sulfate and high vacuum stripping gave 10.5 grams (97 percent yield) of S-2,2,2-trichloroethyl-S-ethylmethylthiophosphonate as yellow oil, $n_D^{27}$ 1.6048.

EXAMPLE 22

10 grams (0.036 mole) of CP 16 were diluted with 100 ml. of benzene and 8.1 grams (0.08 mole) of diisopropylamine were added to the mixture dropwise with stirring and cooling at a temperature between 20 and 25° C. Stirring for an additional 4 hours at room temperature (25° C.) and standing overnight was applied followed by a 15 minute heating period to 50° C. The cold mixture was then washed as usual with dilute HCl, bicarbonate and water, dried over anhydrous magnesium sulfate and vacuum stripped. 4.5 grams (87% yield) of S-2,2,2-trichloroethyl-methylphosphon - N,N-di-isopropylamidate were obtained as dark amber oil, $n_D^{23}$ 1.6044.

EXAMPLE 23

8 grams (0.033 mole) of CP 16 were diluted with 100 ml. of benzene, 2 grams (0.04 mole) of ethanol added at room temperature and reacted by dropwise addition of 3.5 grams of triethylamine (0.033 mole) with stirring and cooling at a temperature not to exceed 30° C. Additional stirring at room temperature for 1.5 hours, washing of the resulting mixture with dilute HCl, bicarbonate and water, drying over magnesium sulfate and vacuum stripping gave 8 grams of S-2,2-dichlorovinyl-S-ethyl-methylthiophosphonate as amber oil.

EXAMPLE 24

7 grams (0.029 mole) of CP 15 were dissolved in 100 ml. of chloroform and 2.5 grams ethyl mercaptan excess together with 10 ml. of chloroform added at room temperature. 3.39 grams (0.03 mole) of triethylamine and 10 ml. of chloroform were added dropwise with stirring and occasional cooling at a temperature not to exceed 25° C. Washing with water, dilute HCl, dilute bicarbonate, drying of the chloroform solution over anhydrous magnesium sulfate and stripping in high vacuum gave 7.5 grams (98% yield) of S-2,2-dichlorovinyl-S-ethyl-methyl-thiophosphonate as almost colorless oil, $n_D^{22}$ 1.6312.

EXAMPLE 25

8.0 grams of CP 15 (0.033 mole) were dissolved in 150 ml. of benzene and reacted by adding 7.51 grams (0.07 mole) of di-isopropylamine dropwise with stirring and cooling. Stirring for an additional 1.5 hours at room temperature was applied to complete the reaction. After washing this solution with dilute HCl, dilute bicarbonate and water, drying over anhydrous magnesium sulfate and high vacuum stripping, 5 grams of S-2,2-dichlorovinyl-methyl thiophosphon-N,N-diisopropylamidate were obtained as reddish oil.

EXAMPLE 26

To 6 grams (0.0226 mole) of CP 22 in 75 ml. of benzene there were added at room temperature 1.4 grams (0.03 mole) of dry ethanol, 2.3 grams (0.0226 mole) of triethylamine were then added with stirring and cooling dropwise at such a rate as to keep the temperature below 25° C. After completed addition, stirring for 1.5 hours at room temperature and standing overnight, the mixture was washed in order with dilute HCl, dilute bicarbonate and water, dried over anhydrous magnesium sulfate and high vacuum stripped. 5 grams (78% yield) of S-2,2,2-trichloroethyl-O-ethyl-ethylphosphonate were obtained as yellow oil, $n_D^{28}$ 1.5085.

EXAMPLE 27

To 10 grams (0.036 mole) of CP 22 in 75 ml. of benzene 2.5 grams (0.04 mole) of ethyl mercaptan were added at room temperature. 3.6 grams (0.036 mole) of triethylamine were then added dropwise with stirring and cooling at a temperature below 25° C. After completed addition of the reagents stirring was continued for 2½ hours and the whole was allowed to stand overnight. The mixture was washed as usual with dilute HCl, dilute bicarbonate and water, dried over anhydrous magnesium sulfate and high vacuum stripped. 10 grams (92% yield) of S-2,2,2-trichloroethyl-S-ethyl-ethylphosphonate were obtained as yellow oil, $n_D^{28}$ 1.5565.

EXAMPLE 28

13.8 grams (0.05 mole) of CP 22 were dissolved in 150 ml. of ether and 10.1 grams di-isopropylamine (0.1 mole) were added slowly dropwise with stirring at room temperature. After completed addition of the reagent, stirring was continued at room temperature for one additional hour. The whole was washed with water, dried over magnesium sulfate and high vacuum stripped. 1 gram of S-2,2,2-trichloroethyl-ethylphosphon-N,N-di-isopropylamidate as a viscous oil was obtained. (Most of the compound was lost in the water wash.)

EXAMPLE 29

To 10 grams (0.042 mole) of CP 23 dissolved in 100 ml. of benzene, 2.3 grams (0.05 mole) of dry ethanol were added at room temperature. 4.22 grams (0.042 mole) of dry ethylamine were then added slowly dropwise with stirring and occasional cooling at a temperature not to exceed 25° C. After completed addition of the reagent, stirring was continued for 2½ hours and the whole was allowed to stand overnight. Washing of the resulting mixture as usual with dilute HCl and dilute bicarbonate, drying over anhydrous magnesium sulfate and vacuum stripping gave 9 grams (87% yield) of S-2,2-dichlorovinyl-O-ethyl-ethylphosphonate at red oil, $n_D^{23}$ 1.5270.

EXAMPLE 30

10 grams (0.042 mole) of CP 23 were dissolved in 100 ml. of petroleum ether and 5 grams (slight excess over 2 molar proportion) in 15 ml. of petroleum ether were added dropwise with stirring and cooling at a temperature below 10° C. (ice water bath). Stirring overnight, washing with water, dilute HCl, dilute bicarbonate, drying over magnesium sulfate (50 cc. benzene were necessary to render mixture homogeneous) and high vacuum stripping gave 9.5 grams (87 percent yield) S-2,2-dichlorovinyl-ethylphosphon-N-isopropylamidate as a light viscous oil, $n_D^{23}$ 1.5460.

EXAMPLE 31

12 grams (0.05 mole) of CP 23 were dissolved in 100 ml. of dry benzene and 11.1 grams (0.11 mole) of di-isopropylamine were added with stirring dropwise at about 25° C. After completed addition of the reagents the mixture was stirred for 4 additional hours and finally allowed to stand at room temperature overnight. Heating to 50° C. for 30 minutes to complete the reaction and cooling followed by washing, drying over anhydrous magnesium sulfate and high vacuum stripping, gave 1.5 grams (10% yield) of S - 2,2 - dichlorovinyl-ethyl-phosphon-N,N-di-isopropylamidate as dark oil, $n_D^{24}$ 1.5500.

EXAMPLE 32

To 7 grams of CP 32 (0.24 mole) diluted with 75 ml. of benzene, 1.4 grams (0.3 mole) of dry ethyl alcohol were added at once at room temperature. 2.5 grams (0.24 mole) of triethylamine diluted with 25 ml. of dry benzene were then added dropwise with stirring and occasional cooling at a temperature below 25° C. Standing overnight, washing of the mixture with dilute HCl, dilute bicarbonate, drying over anhydrous magnesium sulfate and high vacuum stripping gave 5 grams (69% yield) of S-2,2,2-trichloroethyl-O-ethyl-ethylphosphonate as a yellow oil, $n_D^{24}$ 1.5840.

EXAMPLE 33

10 grams (0.034 mole) of CP 32 were diluted with 75 ml. of benzene and 2.5 grams (0.04 mole) of ethyl mercaptan were added at room temperature. 3.5 grams (0.034 mole) of triethylamine diluted with 25 ml. of benzene then were added dropwise with stirring and occasional cooling at a temperature below 25° C. Stirring for an additional 3 hours, allowing to stand overnight, washing the resulting solution in order with dry HCl, bicarbonate and water, drying over anhydrous magnesium sulfate and high vacuum stripping gave 10.5 grams (97% yield) of S - 2,2,2 - trichloroethyl-S-ethyl-ethylthiophosphonate as a colorless oil, $n_D^{24}$ 1.5992.

EXAMPLE 34

14.6 grams (0.05 mole) of CP 32 were diluted with 150 ml. of ether and 10.1 grams of di-isopropylamine (0.1 mole) were added dropwise with stirring and occasional cooling. The reaction is exothermic but precipitation was poor. After completed addition, stirring was continued for one further hour. In order to complete the reaction (pH was still basic) the mixture was heated to slight reflux for 30 minutes. Cooling, filtration with charcoal, and high vacuum stripping of the ether solution without washing gave 9 grams of S-2,2,2-trichloroethyl-ethylthiophosphon-N,N-di-isopropylamidate as viscous oil, 50% yield.

EXAMPLE 35

To a solution of 13 grams (0.02 mole) of CP 33 in 100 ml. of benzene 3 grams (0.06 mole) of dry ethyl alcohol were added followed by 5 grams (0.05 mole) of triethylamine which was added slowly with stirring at room temperature. The addition temperature was kept below 35° C. with occasional cooling. After completed addition, stirring was continued for two more hours at room temperature, cooled, washed as usual with dilute HCl, dilute bicarbonate and water, dried over anhydrous magnesium sulfate, filtered and high vacuum stripped. 10 grams (76% yield) of S - 2,2-dichlorovinyl-O-ethyl-ethylthiophosphonate were obtained as a yellow oil.

EXAMPLE 36

To 13 grams (0.05 mole) of CP 33 in 100 ml. of benzene, 3.1 grams (0.05 mole) of ethyl mercaptan were added at room temperature. 5 grams (0.05 mole) of triethylamine were then added dropwise with stirring at room temperature allowing the mixture to warm to 35° C. After completed addition, stirring was continued for two more hours at room temperature, cooled, washed as usual with dilute HCl, dilute bicarbonate and water, dried over anhydrous magnesium sulfate, filtered and high vacuum stripped. 10 grams (76% yield) of S-2,2-dichlorovinyl-S-ethyl-thiophosphonate were obtained as yellow oil.

EXAMPLE 37

To a solution of 12.8 grams (0.05 mole) of CP 33 in 100 ml. of benzene, 11.1 grams of di-isopropylamine (0.11 mole) were added dropwise with stirring and cooling at 25° C. After completed addition of the reagent, stirring was continued for a further four hours. Allowing to stand overnight, heating to 50° C. for 30 minutes and cooling completed the reaction. The resulting mixture was then washed as usual with dilute HCl, dilute bicarbonate and water, dried over magnesium sulfate and high vacuum stripped. 95 grams (60% yield, of S-2,2-dichlorovinyl-ethylthiophosphon - N,N - di-isopropylamidate were obtained as amber oil, $n_D^{24}$ 1.5595.

EXAMPLE 38

9.72 grams (0.03 mole) of CP 8 were added dropwise with cooling to 60 ml. of dry ethyl alcohol—the large excess serving as solvent—followed by dropwise addition of 3 grams (0.03 mole) of triethylamine with stirring and cooling at a temperature of below 35° C. After allowing the mixture to stir at room temperature for several hours, the ethyl alcohol was evaporated in vacuum and the residue washed in water to remove most of the triethylamine hydrochloride. The formed oil was then taken up with Skellysolve B, washed twice with dilute HCl and water, dried over magnesium sulfate and stripped in high vacuum. 10 grams (quantitative yield) of S-2,2,2-trichloroethyl-O-ethyl-phenylphosphonate was obtained as a light yellow oil.

EXAMPLE 39

To a solution of 9.7 grams (0.03 mole) of CP 8 in 50 ml. of dry benzene, 3.6 grams (0.06 mole) of mono-isopropylamine were added dropwise with stirring at room temperature with occasional cooling. After completed addition of the reagent, the mixture was stirred for a further two hours at room temperature. The resulting mixture was washed, dried over magnesium sulfate and high vacuum stripped. 9.5 grams (92% yield) of S-2,2,2-trichloroethyl-phenylphosphonmono-isopropylamidate were obtained as a white solid, melting point 103–117° C.

EXAMPLE 40

9.7 grams (0.03 mole) of CP 8 were diluted with 50 ml. of benzene and 6.1 grams (0.06 mole) of dissopropylamine were added dropwise with stirring at room temperature. Additional stirring for two hours and standing overnight completed the reaction. Washing as usual, drying over magnesium sulfate and high vacuum stripping gave 5 grams (43% yield) of S-2,2,2-trichloroethyl-phenylphosphon-diisopropylamidate as yellow oil, $n_D^{22}$ 1.5445.

EXAMPLE 41

10 grams (0.035 mole) of CP 10 were dissolved in 100 ml. of benzene and 2.12 grams (0.04 mole) of dry ethanol were added at room temperature. 4.04 grams (0.04 mole) of triethylamine were then added dropwise with stirring and occasional cooling followed by an additional stirring period of 2½ hours. Allowing to stand overnight, washing of the resulting mixture with dilute HCl, dilute bicarbonate and water, drying over anhydrous magnesium sulfate and high vacuum stripping gave 10 grams of S-2,2-dichlorovinyl-O-ethyl-phenylphosphonate (97% yield) as red oil, $n_D^{24}$ 1.5702.

EXAMPLE 42

14.3 grams (0.05 mole) of CP 10 were diluted with 100 ml. of carbon tetrachloride and 3.1 grams (0.05 mole) of ethyl mercaptan were added at room temperature (25° C.). 5.0 grams (0.05 mole) of triethylamine were then added to the mixture dropwise with stirring and cooling. Additional stirring at room temperature for 48 hours completed the reaction. Filtration, washing of the organic layer with dilute HCl and water, drying over magnesium sulfate and high vacuum stripping gave 14.5 grams (93% yield) of S-2,2-dichlorovinyl - S - ethyl-phenylphosphonate as yellow oil, $n_D^{22}$ 1.6216.

EXAMPLE 43

14.3 grams (0.05 mole) of CP 10 were diluted with 75 ml. of benzene and 6 grams (0.1 mole) of monoisopropylamine added with stirring at room temperature with occasional cooling. Standing overnight was applied for completion of the reaction. Washing of the obtained mixture, drying over magnesium sulfate and stripping in vacuum gave 12.5 grams (81% yield) of S-2,2-dichlorovinylphenylphosphon-monoisopropylamidate as a white solid, melting point 75–87° C.

EXAMPLE 44

10 grams (0.035 mole) of CP 10 were diluted with 100 ml. of benzene at room temperature and 4.04 grams (0.04 mole) of di-isopropylamine were added dropwise with stirring at between 20–25° C. (cooling by means of an ice-water bath). Additional stirring for 2½ hours and standing overnight was applied to complete the reaction. The mixture was then washed as usual, dried over magnesium sulfate and high vacuum stripped. 8.5 grams (70% yield) of S-2,2,2-dichlorovinyl-phenylphosphon - di - isopropylamidate were obtained as viscous oil, $n_D^{24}$ 1.5626.

EXAMPLE 45

10.2 grams (0.03 mole) of CP 9 were dissolved in 50 ml. of benzene and 3 grams (0.03 mole) of ethyl mercaptan were added at room temperature. To this mixture, 3 grams (0.03 mole) of triethylamine were added dropwise with stirring and occasional cooling at a temperature not to exceed 25° C. After allowing to stir the mixture for an additional 2 hours, washing of the resulting mixture as usual, drying over magnesium sulfate and high vacuum stripping, 11 grams (quantitative yield) S-2,2,2-trichloroethyl - S - ethyl-phenylthiophosphonate were obtained as colorless oil, $n_D^{22}$ 1.6320.

EXAMPLE 46

10.2 grams (0.03 mole) of CP 9 were dissolved in 50 ml. of benzene and 3.6 grams (0.03 mole) of monoisopropylamine were added dropwise with stirring and cooling at between 25 and 30° C. Stirring was then continued for another two hours at room temperature and the whole was allowed to stand overnight. The resulting mixture was washed as usual with dilute HCl, dilute bicarbonate and water, dried over anhydrous magnesium sulfate and high vacuum stripped. 9 grams (83% yield) of S-2,2,2-trichloroethyl - phenylthiophosphon-mono-isopropylamidate were obtained as a colorless oil, $n_D^{22}$ 1.6666.

EXAMPLE 47

10.2 grams of CP 9 (0.03 mole) were diluted with 50 ml. of dry benzene and 6.1 grams (0.06 mole) of di-isopropylamine were added dropwise with stirring and cooling at room temperature. Allowing to stir for a further two hours at room temperature and standing overnight completed the reaction. Washing with dilute HCl, dilute bicarbonate and water of the resulting mixture, drying over magnesium sulfate and high vacuum stripping gave 7 grams (59% yield) of S-2,2,2-trichloroethyl-phenylthiophosphon-di-isopropylamidate as an off-white solid, melting point 92–100° C.

EXAMPLE 48

10 grams (0.033 mole) of CP 11 dissolved in 100 ml. of benzene were mixed with 2.12 grams of dry ethanol (0.04 mole) of 4.04 grams (0.04 mole) of triethylamine were added to this mixture dropwise with stirring and occasional cooling at room temperature. After completed addition of the reagents, stirring was continued for a further two hours at room temperature. After allowing the resulting mixture to stand overnight it was washed in succession with dilute HCl, dilute bicarbonate and water; drying over anhydrous magnesium sulfate and high vacuum stripping gave 10.5 grams (quantitative yield) of S-2,2-dichlorovinyl-O-ethyl-phenyl-thiophosphonate as a red oil, $n_D^{24}$ 1.5900.

EXAMPLE 49

12 grams (0.039 mole) of CP 11 were dissolved in 75 ml. of benzene and 4.7 grams (0.08 mole) of monoisopropylamine were added dropwise with stirring and cooling at room temperature. After completed addition of the reagent, the mixture was allowed to stand overnight. Washing, drying over magnesium sulfate and high vacuum stripping gave 10.5 grams (81 percent yield) of S-2,2 - dichlorovinyl-phenyl-thiophosphon-mono isopropylamidate as amber oil, $n_D^{22}$ 1.6246.

EXAMPLE 50

10 grams (0.033 mole) of CP 11 diluted with 100 ml. of benzene and a mixture of 4.04 grams (0.04 mole) of di-isopropylamine and 4.04 grams tri-ethylamine (0.04 mole) in 25 ml. of benzene is added dropwise with stirring and cooling at 20–25° C. Additional stirring for 2 hours and allowing to stand overnight gave after filtration, washing (dilute HCl, $NaHCO_3$), drying ($MgSO_4$) and high vacuum stripping 8 grams (66 percent yield) of S-2,2 - dichlorovinyl-phenyl-thiophosphon-di-isopropylamidate as a viscous oil, $n_D^{24}$ 1.6400.

EXAMPLE 51

3.0 grams (0.62 M, excess) of methyl mercaptan gas were introduced at 70° C. into a solution of 8.7 grams (0.033 M) of CP 12 in 60 ml. of dry Skellysolve B and 40 ml. of benzene. Then, with ice water cooling, 3.4 grams (0.033 M, slight excess) of $Et_3N$ in 10 ml. of "Skelly B" were added dropwise with stirring at 15–20° C. After a two hour standing period at room temperature, the mixture was washed (water, dilute HCl, dilute $NaHCO_3$), dried (over $MgSO_4$) and stripped in vacuum (.05 mm. Hg, 50° C.), 7.5 grams (84 percent yield) of S-2,2,2-trichloroethyl-S-methyl-methyl phosphonate were obtained as almost colorless oil, which solidified on prolonged standing.

EXAMPLE 52

7.5 grams (0.0285 M) of CP 12 were dissolved in 70 ml. of Skellysolve B, 4 grams (0.045 M, large excess) of BuSH added with ice-water cooling and 2.9 grams (0.0285 M) of $Et_3N$ in 10 ml. of Skellysolve B added at 15–20° dropwise with stirring and cooling. Stirring for a further 30 minutes at room temperature, washing ($H_2$, dilute HCl, dilute $NaHCO_3$), drying ($MgSO_4$) and stripping (.05 mm. Hg, 70° C.) gave 7.5 grams (85 percent yield) of S-2,2,2-trichloroethyl-S-butyl-methyl phosphonate as pale yellow liquid.

EXAMPLE 53

7.6 grams (0.029 M) of CP 12 were dissolved in 50 ml. of 1:1 Skellysolve B-Benzene and 6.2 grams (0.058 M) of N-methyl aniline in 20 ml. of benzene added. The reaction proceeded at a reasonable rate at slightly elevated temperatures. When all the aniline was added a 2 hours' heating period at 55° C. was sufficient to complete the reaction. Cooling to room temperature and filtration, followed by washing (dilute HCl, $NaHCO_3$, and water), drying ($MgSO_4$) and vacuum stripping gave 8 grams (85 percent yield) of S-2,2,2-trichloro ethyl-methyl-phosphon-N,N-methyl-phenyl amidate as a light brown oil which solidified on prolonged standing.

EXAMPLE 54

2.2 grams (0.025 M) of piperazine and 5.1 grams (0.05 M) of $Et_3N$ were dissolved together in 100 ml. of $CHCl_3$. 13.8 grams (0.5 M) of CP 22 (S-2,2,2-trichloroethylethyl thiophosphonyl chloride) were then slowly added dropwise with stirring at 20–25° C. and occasional cooling. Two hours continuous stirring at room temperature, washing (water, dilute HCl, dilute HCl, dilute $NaHCO_3$), drying ($MgSO_4$) and stripping gave 11.5 g. (80%) of bis[S - 2,2,2 - trichloroethyl-ethyl-thiophosphonyl] piperazine-1,4 as crude dark oil, which solidified. Washing with fresh benzene gave a buff colored solid, M.P. 160–8° C., percent Cl 37.7 calc., 36.5 fd. percent P 11.0 calc., 10.9 fd.

EXAMPLE 55

8 grams (0.025 M) of CP 8 were dissolved in 150 ml. of dry petroleum ether and a total of 3 grams (0.067 M, excess) of dimethyl amine gas was introduced at a temperature below 10° C. with stirring and cooling over a period of approximately 15 minutes. Prolonged stirring for 30 minutes at below 15° C. and at room temperature for a further two hours, removing of the formed dimethylamine hydrochloride by washing (water, dilute HCl, dilute $NaHCO_3$), drying and stirring in vacuum gave 8.2 grams (quantitative yield) of S - 2,2,2 - trichloroethyl-phenyl-phosphon-N,N-dimethyl-amidate as a light yellow, mobile liquid, $n_D^{25}$ 1.5790; percent Cl 31.9 cal., 32.5 fd., percent P 9.3 cal., 9.7 fd., and percent N 4.2 cal., 3.9 fd.

EXAMPLE 56

9.72 grams (0.03 M) CP 8 were dissolved in 75 ml. petroleum ether and 25 ml. of benzene, 4.24 grams (0.029 M) of p-chloro thiophenol added at room temperature followed by dropwise addition with stirring and cooling of 3 grams (0.03 M) of $Et_3N$ at below 35° C. followed in turn by heating for 30 minutes at 55° C. and allowing to cool to room temperature with stirring. Washing (water, dilute HCl, dilute $NaHCO_3$) drying over anh. $MgSO_4$, and stripping in high vacuum gave 11.5 grams (89 percent yield) of S-2,2,2-trichloroethyl-S-p-chlorophenyl-phenyl-phosphonate as a very heavy oil, $n_D^{25}$ 1.6415; percent Cl 32.9 cal., 33.2 fd., percent P 7.2 cal., 6.8 fd.

EXAMPLE 57

9.72 grams (0.03 M) of CP 8 were dissolved in a mixture of 75 ml. petroleum ether and 25 ml. benzene, 3.8 grams (0.03 M) of p-chlorophenol added followed by dropwise addition with stirring and cooling at below 35° C. of 3 grams (0.03 M) of $Et_3N$. A short period of heating to 55° C. and allowing to cool to room temperature over a total period of 1 hour was applied to assure quantitative reaction. Washing (water, dilute HCl, dilute $NaCHO_3$), drying ($MgSO_4$) and stripping (vacuum) gave 11.0 grams (88 percent yield) of S-2,2,2-trichloroethyl-O-p-chlorophenyl-phenyl-phosphonate, percent Cl 34.2 cal.. 33 fd., percent P 7.5 fd.

EXAMPLE 58

9.72 grams (0.03 M) of CP 8 were dissolved in 150 ml. of benzene 4.3 grams (0.031 M) of $Et_3N$. Heating for a short period of time to 55° C., allowing to stir at room temperature overnight, washing (water, dilute HCl, dilute $NaHCO_3$), drying ($MgSO_4$) and stripping (vacuum) gave a total of 11.5 grams (90% yield) of crude S-2,2,2-trichloroethyl - O - p - nitrophenyl - phenyl - phosphonate, which on recrystallizing gave m. 93°–6° C. percent Cl 24.9 cal., 24.9 fd., percent P 7.3 cal., 7.5 fd., percent N 3.3 cal., 3.2 fd.; (IR 57).

The pesticides of the present invention can be used alone or they can be applied together with inert solids to form dusts, or can be suspended in a suitable liquid dilute, e.g., organic solvents or water.

There can also be added surface active agents or wetting agents and/or inert solids in the liquid formulations. In such case, the active ingredient can be from 0.01 to 95% by weight of the entire composition.

As organic solvents there can be employed hydrocarbons, e.g. benzene, toluene, xylene, kerosene, diesel fuel, fuel oil, and petroleum naphtha, ketones such as acetone, methyl ethyl ketone and cyclohexanone, chlorinated hydrocarbons such as carbon tetrachloride, chloroform, trichloroethylene, and perchloroethylene, esters such as ethyl acetate, amyl acetate and butyl acetate, ethers, e.g. ethylene glycol monomethyl ether and diethylene glycol monomethyl ether, alcohols, e.g. methanol, ethanol, isopropanol, amyl alcohol, ethylene glycol, propylene glycol, butyl carbitol acetate and glycerine. Mixtures of water and organic solvents, either as solutions or emulsions, can be employed.

The novel pesticides can also be applied as aerosols, e.g. by dispersing them in air by means of a compressed gas such as dichlorodifluoromethane or trichlorofluoromethane and other Freons and Genetrons, for example.

The pesticides of the present invention can also be applied with adjuvants or carriers such as talc, pyrophyllite, synthetic fine silica, attapulgus clay, kieselguhr, chalk, diatomaceous earth, lime, calcium carbonate, bentonite, fuller's earth, cotton-seed hulls, wheat flour, soybean flour, pumice, tripoli, wood flour, walnut shell flour, redwood flour and lignin.

As stated, it is frequently desirable to incorporate a surface active agent in the pesticidal compositions of the present invention. Such surface active or wetting agents are advantageously employed in both the solid and liquid compositions. The surface active agent can be anionic, cationic or nonionic in character.

Typical classes of surface active agents include alkyl sulfonate salts, alkylaryl sulfonate salts, alkylaryl polyether alcohols, fatty acid esters of polyhydric alcohols and the alkylene oxide addition products of such esters, and addition products of long chain mercaptans and alkylene oxides. Typical examples of such surface active agents include the sodium alkylbenzene sulfonates having 10 to 18 carbon atoms in the alkyl group, alkylphenol ethylene oxide condensation products, e.g. p-isooctylphenol condensed with 10 ethylene oxide units, soaps, e.g. sodium stearate and potassium oleate, sodium salt of propylnaphthalene sulfonic acid, di (2-ethylhexyl) ester of sodium sulfosuccinic acid, sodium lauryl sulfate, sodium decane sulfonate, sodium salt of the sulfonated monoglyceride of cocoanut fatty acids, sorbitan sesquioleate, lauryl trimethyl ammonium chloride, octadecyl trimethyl ammonium chloride, polyethylene glycol lauryl ether, polyethylene glycol esters of fatty acids and rosin acids, e.g. Ethofat 7 and 13, sodium N-methyl-N-oleyl taurate, Turkey Red Oil, sodium dibutyl naphthalene sulfonate, sodium lignin sulfonate, polyethylene glycol stearate, sodium dodecylbenzene sulfonate, tertiary dodecyl polyethylene glycol thioether (Nonionic 218), long chain ethylene oxide-propylene oxide condensation products, e.g. Pluronic 61 (molecular weight 1000), polyethylene glycol ester of tall oil acids, sodium octyl phenoxyethoxyethyl sulfate, tris (polyoxyethylene) sorbitan monostearate (Tween 60), and sodium dihexyl sulfosuccinate.

The solid and liquid formulations can be prepared by any of the conventional procedures. The compounds of the present invention can be applied to soil, growing plants, e.g. trees, cotton plants, wheat and other grain plants, vegetable plants, seeds, fabrics, etc. to give pesticidal protection.

The compounds can be used as nematocides at a dosage of 0.1 to 100 lbs./acre, more usually from 1 to 30 lbs./acre. As soil fungicides they are usually employed at a dosage of 0.5 to 50 lbs./acre and as foliar fungicides. They are used at 0.1 to 20 lbs./acre. As insecticides, they are normally used in a dosage of 0.2 to 10 lbs./acre.

The compounds of the present invention were tested as fungicides in agar plate tests using potato dextrose agar as the culture medium. In Table 1 the following abbreviations are used:

C.U. for *Ceratocystis ulmi*
Col. Ob. for *Colletorichium obiculare*
F. ox. lyco for *Fusarium oxy lycopersici*
F. Niv. for *Fusarium nivale*
Hel. Sat. for *Helminthosporium sativum*
Rhyz. Sol. for *Rhizoctonia solani*
Vert. for *Verticillium albo-atrum*

The tests were carried out at rates of 500 p.p.m., 100 p.p.m. and 10 p.p.m. as shown in Table 1. In the table, 10 indicates 100% effectiveness (complete inhibition) and 0 indicates no effectiveness.

TABLE 1.—AGAR PLATES

| | | | Organism at p.p.m. of— | | | | | | | | | | | | | | | | | | | | |
|---|---|---|---|---|---|---|---|---|---|---|---|---|---|---|---|---|---|---|---|---|---|---|---|
| | | | *C.U.* | | | *Col. Ob.* | | | *F. ox. lyco* | | | *F. Niv.* | | | *Hel. Sat.* | | | *Rhyz. Sol.* | | | *Vert.* | | |
| Example | Structure, Me | | 500 | 100 | 10 | 500 | 100 | 10 | 500 | 100 | 10 | 500 | 100 | 10 | 500 | 100 | 10 | 500 | 100 | 10 | 500 | 100 | 10 |
| 13 | 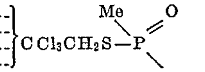 | OEt | 5 | 0 | 0 | 5 | 0 | 0 | 5 | 0 | 0 | 8 | 5 | 0 | 5 | 5 | 0 | 5 | 0 | 0 | 5 | 0 | 0 |
| 14 | | SEt | 10 | 5 | 0 | 5 | 0 | 0 | 8 | 0 | 0 | 10 | 5 | 0 | 5 | 0 | 0 | 10 | 5 | 0 | 10 | 5 | 0 |
| 15 | | NHiPro | 10 | 0 | 0 | 10 | 0 | 0 | 10 | 0 | 0 | 10 | 0 | 0 | 5 | 0 | 0 | 10 | 0 | 0 | 10 | 10 | 10 |
| 16 | | NiPro$_2$ | 8 | 5 | 5 | 5 | 5 | 0 | 10 | 5 | 5 | 10 | 10 | 8 | 5 | 5 | 5 | 10 | 10 | 0 | 10 | 5 | 5 |
| 17 | 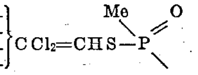 | OEt | 8 | 5 | 5 | 8 | 5 | 5 | 5 | 0 | 0 | 10 | 0 | 0 | 8 | 5 | 5 | 0 | 0 | 0 | 5 | 0 | 0 |
| 18 | | SEt | 10 | 8 | 0 | 10 | 0 | 0 | 10 | 0 | 0 | 10 | 10 | 0 | 10 | 5 | 5 | 0 | 0 | 0 | 10 | 5 | 0 |
| 7 | | NHiPro | 10 | 0 | 0 | 10 | 0 | 0 | 0 | 0 | 0 | 10 | 0 | 0 | 0 | 0 | 0 | 0 | 0 | 0 | 10 | 10 | 0 |
| 19 | | NiPro$_2$ | 10 | 10 | 5 | 10 | 0 | 0 | 0 | 0 | 0 | 10 | 10 | 10 | 10 | 8 | 0 | 0 | 0 | 0 | 10 | 10 | 10 |
| 20 | 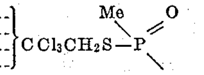 | OEt | 5 | 5 | 5 | 5 | 0 | 0 | 0 | 0 | 0 | 0 | 0 | 0 | 5 | 5 | 0 | 0 | 0 | 0 | 0 | 0 | 0 |
| 21 | | SEt | 0 | 0 | 0 | 0 | 0 | 0 | 0 | 0 | 0 | 0 | 0 | 0 | 5 | 0 | 0 | 0 | 0 | 0 | 0 | 0 | 0 |
| 4 | | NHiPro | 8 | 8 | 5 | 8 | 8 | 5 | 8 | 5 | 0 | 10 | 10 | 10 | 8 | 5 | 0 | 10 | 10 | 5 | 8 | 5 | 5 |
| 22 | | NiPro$_2$ | 10 | 0 | 0 | 0 | 0 | 0 | 0 | 0 | 0 | 0 | 0 | 0 | 0 | 0 | 0 | 0 | 0 | 0 | 10 | 10 | 8 |
| 23 | 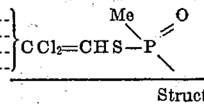 | OEt | 10 | 8 | 5 | 5 | 5 | 0 | 5 | 5 | 0 | 10 | 10 | 10 | 5 | 5 | 5 | 10 | 8 | 5 | 5 | 0 | 0 |
| 24 | | SEt | 10 | 5 | 0 | 10 | 10 | 0 | 8 | 0 | 0 | 10 | 10 | 10 | 10 | 0 | 0 | 10 | 0 | 0 | 10 | 0 | 0 |
| 10 | | NHiPro | 10 | 8 | 5 | 10 | 10 | 0 | 10 | 10 | 5 | 10 | 10 | 10 | 10 | 10 | 5 | 10 | 0 | 0 | 10 | 0 | 0 |
| 25 | | NiPro$_2$ | 10 | 8 | 5 | 5 | 5 | 0 | 5 | 0 | 0 | 10 | 10 | 10 | 5 | 5 | 5 | 10 | 5 | 5 | 10 | 8 | 0 |
| | Structure, Et | | | | | | | | | | | | | | | | | | | | | | |
| 26 | 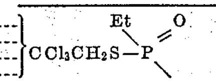 | OEt | 10 | 5 | 0 | 10 | 5 | 0 | 8 | 0 | 0 | 10 | 5 | 0 | 5 | 0 | 0 | 10 | 5 | 0 | 10 | 5 | 0 |
| 27 | | SEt | 5 | 0 | 0 | 0 | 0 | 0 | 5 | 0 | 0 | 5 | 0 | 0 | 5 | 0 | 0 | 0 | 0 | 0 | 5 | 5 | 0 |
| 2 | | NHiPro | 10 | 10 | 5 | 10 | 5 | 0 | 10 | 5 | 0 | 10 | 5 | 0 | 5 | 5 | 5 | 10 | 5 | 0 | 10 | 5 | 0 |
| 28 | | NiPro$_2$ | 5 | 0 | 0 | 5 | 0 | 0 | 5 | 0 | 0 | 8 | 5 | 5 | 5 | 5 | 5 | 10 | 10 | 0 | 5 | 0 | 0 |
| 29 | 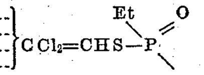 | OEt | 8 | 0 | 0 | 5 | 0 | 0 | 5 | 0 | 0 | 8 | 0 | 0 | 8 | 5 | 5 | 10 | 0 | 0 | 5 | 0 | 0 |
| 8 | | SEt | 10 | 2 | 0 | 10 | 0 | 0 | 8 | 0 | 0 | 10 | 5 | 0 | 8 | 5 | 5 | 5 | 5 | 0 | 0 | 0 | 0 |
| 30 | | NHiPro | 10 | 2 | 0 | 10 | 8 | 0 | 5 | 0 | 0 | 10 | 5 | 0 | 5 | 5 | 0 | 5 | 0 | 0 | 10 | 0 | 0 |
| 31 | | NiPro$_2$ | 10 | 10 | 5 | 0 | 0 | 0 | 0 | 0 | 0 | 10 | 10 | 10 | 0 | 0 | 0 | 5 | 0 | 0 | 10 | 10 | 8 |
| 32 | 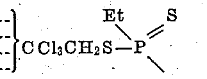 | OEt | ---- | ---- | ---- | ---- | ---- | ---- | ---- | ---- | ---- | ---- | ---- | ---- | ---- | ---- | ---- | ---- | ---- | ---- | ---- | ---- | ---- |
| 33 | | SEt | 0 | 0 | 0 | 5 | 0 | 0 | 0 | 0 | 0 | 0 | 0 | 0 | 0 | 0 | 0 | 0 | 0 | 0 | 0 | 0 | 0 |
| 5 | | NHiPro | 5 | 5 | 0 | 8 | 5 | 0 | 5 | 0 | 0 | 10 | 8 | 5 | 5 | 0 | 0 | 10 | 8 | 5 | 8 | 5 | 0 |
| 34 | | NiPro$_2$ | 8 | 5 | 5 | 5 | 0 | 0 | 5 | 0 | 0 | 10 | 5 | 5 | 5 | 5 | 5 | 10 | 5 | 0 | 5 | 0 | 0 |
| 35 | 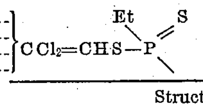 | OEt | 5 | 0 | 0 | 5 | 0 | 0 | 5 | 0 | 0 | 10 | 8 | 5 | 0 | 0 | 0 | 10 | 0 | 0 | 5 | 0 | 0 |
| 36 | | SEt | 5 | 0 | 0 | 5 | 0 | 0 | 5 | 0 | 0 | 10 | 5 | 2 | 5 | 0 | 0 | 0 | 0 | 0 | 0 | 0 | 0 |
| 11 | | NHiPro | 10 | 8 | 5 | 10 | 8 | 5 | 10 | 8 | 0 | 10 | 10 | 5 | 10 | 8 | 5 | 10 | 10 | 5 | 10 | 10 | 5 |
| 37 | | NiPro$_2$ | 10 | 10 | 5 | 10 | 0 | 0 | 0 | 0 | 0 | 10 | 0 | 0 | 5 | 0 | 0 | 5 | 0 | 0 | 10 | 10 | 8 |
| | Structure, Ph | | | | | | | | | | | | | | | | | | | | | | |
| 38 | 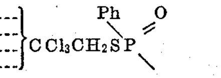 | OEt | 10 | 8 | 5 | 10 | 0 | 0 | 10 | 8 | 0 | ---- | ---- | ---- | 10 | 0 | 0 | 10 | 8 | 5 | 10 | 10 | 8 |
| 3 | | SEt | 10 | 8 | 0 | 10 | 0 | 0 | 10 | 0 | 0 | ---- | ---- | ---- | 2 | 0 | 0 | 10 | 5 | 5 | 10 | 8 | 8 |
| 39 | | NHiPro | 5 | 0 | 0 | 5 | 0 | 0 | 0 | 0 | 0 | 5 | 0 | 0 | 0 | 0 | 0 | 0 | 0 | 0 | 5 | 0 | 0 |
| 40 | | NiPro$_2$ | 8 | 5 | 0 | 10 | 5 | 0 | 5 | 0 | 0 | 8 | 0 | 0 | 5 | 0 | 0 | 10 | 0 | 0 | 10 | 5 | 0 |
| 41 | 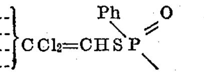 | OEt | 10 | 10 | 5 | 10 | 10 | 0 | 10 | 5 | 0 | 10 | 10 | 10 | 8 | 0 | 0 | 10 | 0 | 0 | 10 | 10 | 10 |
| 42 | | SEt | 10 | 10 | 5 | 8 | 5 | 0 | 8 | 5 | 0 | 10 | 5 | 0 | 10 | 5 | 5 | 10 | 5 | 0 | 8 | 5 | 0 |
| 43 | | NHiPro | 10 | 10 | 5 | 10 | 5 | 0 | 10 | 0 | 0 | 10 | 5 | 0 | 10 | 0 | 0 | 8 | 5 | 0 | 10 | 5 | 0 |
| 44 | | NiPro$_2$ | 10 | 10 | 8 | 10 | 10 | 5 | 0 | 0 | 0 | 10 | 8 | 0 | 0 | 0 | 0 | 0 | 0 | 0 | 10 | 10 | 10 |

TABLE 1.—AGAR PLATES

| Example | Structure, Me | | C.U. 500 | C.U. 100 | C.U. 10 | Col. Ob. 500 | Col. Ob. 100 | Col. Ob. 10 | F. ox. lyco 500 | F. ox. lyco 100 | F. ox. lyco 10 | F. Niv. 500 | F. Niv. 100 | F. Niv. 10 | Hel. Sat. 500 | Hel. Sat. 100 | Hel. Sat. 10 | Rhyz. Sol. 500 | Rhyz. Sol. 100 | Rhyz. Sol. 10 | Vert. 500 | Vert. 100 | Vert. 10 |
|---|---|---|---|---|---|---|---|---|---|---|---|---|---|---|---|---|---|---|---|---|---|---|---|
| 6 | 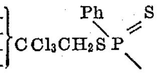 | OEt | 10 | 8 | 5 | 8 | 5 | 0 | 10 | 0 | 0 | 10 | 5 | 0 | 5 | 0 | 0 | 10 | 10 | 0 | 8 | 5 | 0 |
| 45 | | SEt | 10 | 5 | 0 | 8 | 5 | 0 | 8 | 5 | 0 | 10 | 5 | 0 | 8 | 5 | 0 | 10 | 5 | 0 | 8 | 5 | 0 |
| 46 | | NHiPro | 0 | 0 | 0 | 0 | 0 | 0 | 0 | 0 | 0 | 5 | 5 | 0 | 0 | 0 | 0 | 5 | 5 | 0 | 0 | 0 | 0 |
| 47 | | NiPro$_2$ | 10 | 8 | 0 | 5 | 0 | 0 | 5 | 0 | 0 | 10 | 0 | 0 | 5 | 0 | 0 | 10 | 0 | 0 | 5 | 0 | 0 |
| 48 | 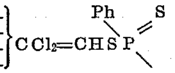 | OEt | 10 | 0 | 0 | 0 | 0 | 0 | 0 | 0 | 0 | 10 | 0 | 0 | 0 | 0 | 0 | 0 | 0 | 0 | 10 | 10 | 10 |
| 12 | | SEt | 5 | 0 | 0 | 5 | 5 | 0 | 0 | 0 | 0 | 5 | 0 | 0 | 0 | 0 | 0 | 5 | 0 | 0 | 5 | 5 | 0 |
| 49 | | NHiPro | 10 | 5 | 0 | 8 | 8 | 5 | 5 | 0 | 0 | 8 | 5 | 2 | 5 | 0 | 0 | 5 | 5 | 2 | 8 | 8 | 5 |
| 50 | | NiPro$_2$ | 10 | 10 | 10 | 10 | 0 | 0 | 0 | 0 | 0 | 10 | 8 | 5 | 10 | 0 | 0 | 5 | 0 | 0 | 10 | 10 | 10 |
| | Structure, additional compounds | | | | | | | | | | | | | | | | | | | | | | |
| 51 | $CCl_3CH_2S(CH_3)P(O)-SCH_3$ | | 10 | 8 | 0 | 10 | 0 | 0 | 10 | 0 | 0 | | | | 10 | 5 | 0 | 8 | 5 | 0 | 10 | 8 | 8 |
| 52 | $CCl_3CH_2S(CH_3)P(O)-SCH_3S(CH_2)_3CH_3$ | | 10 | 8 | 5 | 10 | 0 | 0 | 8 | 5 | 0 | | | | 8 | 5 | 0 | 8 | 5 | 5 | 10 | 8 | 8 |
| 1 | $CCl_3CH_2S(CH_3)P(O)-SCH_3O(2,4Cl_2)C_6H_3$ | | 10 | 8 | 5 | 10 | 10 | 2 | 8 | 0 | 0 | | | | 5 | 0 | 0 | 10 | 10 | 5 | 10 | 10 | 8 |
| 53 | $CCl_3CH_2S(CH_3)P(O)-SCH_3N(CH_3)C_6H_5$ | | 10 | 8 | 5 | 10 | 10 | 8 | 10 | 8 | 0 | | | | 10 | 8 | 0 | 10 | 10 | 5 | 10 | 10 | 8 |
| 54* | $[CCl_3CH_2S(C_2H_5)P(S)]_2$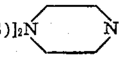 | | 0 | 0 | 0 | 0 | 0 | 0 | 0 | 0 | 0 | 0 | 0 | 0 | 0 | 0 | 0 | 0 | 0 | 0 | 0 | 0 | 8 |
| 55 | $(Cl_3CH_2S(C_6H_5)P(O)-N(CH_3)_2$ | | 10 | 5 | 0 | 10 | 0 | 0 | 10 | 0 | 0 | | | | 10 | 0 | 0 | 10 | 8 | 5 | 10 | 8 | 8 |
| 56 | $CCl_3CH_2S(C_6H_5)P(O)-S(4Cl)C_6H_4$ | | 8 | 5 | 0 | 10 | 10 | 0 | 8 | 0 | 0 | | | | 5 | 0 | 0 | 8 | 5 | 0 | 10 | 8 | 8 |
| 57 | $CCl_3CH_2S(C_6H_5)P(O)-O(4Cl)C_6H_4$ | | 8 | 5 | 0 | 0 | 0 | 0 | 0 | 0 | 0 | | | | 5 | 0 | 0 | 5 | 0 | 0 | 10 | 8 | 8 |
| 58 | $CCl_3CH_2S(C_6H_5)P(O)-O(4NO_2)C_6H_4$ | | 8 | 5 | 0 | 10 | 0 | 0 | 8 | 0 | 0 | | | | 5 | 0 | 0 | 10 | 5 | 0 | 10 | 10 | 8 |
| 9 | $CCl_2=CHS(C_6H_5)P(O)-N(CH_3)_2$ | | 5 | 2 | 0 | 10 | 0 | 0 | 10 | 0 | 0 | | | | 5 | 0 | 0 | 10 | 5 | 0 | 10 | 0 | 0 |

The compounds were also tested as soil fungicides. 2 grams of the compound were mixed with an equal weight of attapulgus clay. The mixture was then blended with soil infested with Pythium. 100 mg. of the 50% formulation in 500 grams of soil is equal to 200 lbs./acre. After blending with the soil, the mixture was allowed to stand for 24 hours. Then the blend was spread evenly over a wet paper towel and 50 pea seeds were placed on the soil. The towels were rolled up and put in metal cans and stored at 40° F. for 5 days and then at 75° F. for 4 days. The cans were then removed and the rate of fungus growth recorded, with 10 indicating no growth (perfect control) and 0 indicating complete growth (no control). The results are set forth in Table 2.

Some of the compounds were also tested in spere germination tests against *Stemphylium sarcinaeforme* and *Ustilago kolleri* speres. The spores were dusted on agar containing the test compound dispersed therethrough. The inoculated samples were incubated at room temperature for 24 hours and the germination recorded on a 0 to 10 scale with 10 indicating no germination and 0 indicating germination. The results are set forth in Table 2 at the indicated dosages in p.p.m. The compounds were less effective in this test than in the agar plate and soil fungicide tests.

TABLE 2.—AGAR PLATES

| Example | Structure, Me. | | Soil fungicide rolled towel, #/A Pythium 200 | Soil fungicide rolled towel, #/A Pythium 50 | Spore germ. 500 | Spore germ. 100 | Spore germ. 10 |
|---|---|---|---|---|---|---|---|
| 13 | 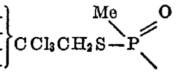 | OEt | 10 | 1 | | | |
| 14 | | SEt | 10 | 0 | | | |
| 15 | | NHiPro | 9 | 2 | | | |
| 16 | | NiPro$_2$ | 3 | 1 | | | |
| 17 | 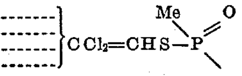 | OEt | | | | | |
| 18 | | SEt | 5 | 3 | | | |
| 7 | | NHiPro | 4 | 3 | | | |
| 19 | | NiPro$_2$ | 7 | 5 | | | |
| 20 | 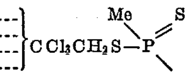 | OEt | 0 | 0 | | | |
| 21 | | SEt | 8 | 0 | | | |
| 4 | | NHiPro | 5 | 5 | 10 | 0 | 0 |
| 22 | | NiPro$_2$ | | | | | |
| 23 | 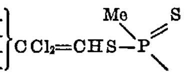 | OEt | 4 | 4 | | | |
| 24 | | SEt | 7 | 4 | | | |
| 10 | | NHiPro | 4 | 3 | | | |
| 25 | | NiPro$_2$ | 1 | 2 | | | |
| | Structure, Et | | | | | | |
| 26 | 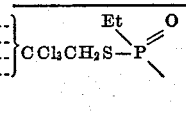 | OEt | 10 | 0 | | | |
| 27 | | SEt | 10 | 0 | | | |
| 2 | | NiHPro | 8 | 6 | 5 | 0 | 0 |
| 28 | | NiPro$_2$ | 5 | 1 | | | |

TABLE 2.—AGAR PLATES

| Example | Structure, Me. | | Soil fungicide rolled towel, #/A Pythium 200 | 50 | Spore germ. 500 | 100 | 10 |
|---|---|---|---|---|---|---|---|
| 29 | 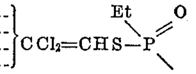 | OEt | 0 | 0 | | | |
| 8 | | SEt | 2 | 2 | | | |
| 30 | | NHiPro | 2 | 0 | | | |
| 31 | | NiPro$_2$ | 7 | 3 | | | |
| 32 | 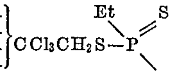 | OEt | 0 | 0 | | | |
| 33 | | SEt | 0 | 0 | | | |
| 5 | | NHiPro | 5 | 5 | 0 | 0 | 0 |
| 34 | | NiPro$_2$ | 0 | 0 | | | |
| 35 | 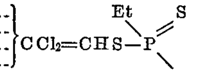 | OEt | 5 | 4 | | | |
| 36 | | SEt | 3 | 5 | | | |
| 11 | | NHiPro | 0 | 0 | 0 | 0 | 0 |
| 37 | | NiPro$_2$ | 7 | 8 | | | |
| | Structure, Ph | | | | | | |
| 38 | 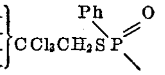 | OEt | 0 | 0 | 0 | 0 | 0 |
| 3 | | SEt | 7 | 0 | 0 | 0 | 0 |
| 39 | | NHiPro | 1 | 0 | 0 | 0 | 0 |
| 40 | | NiPro$_2$ | 0 | 0 | 5 | 0 | 0 |
| 41 | 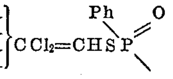 | OEt | 3 | 2 | 0 | 0 | 0 |
| 42 | | SEt | 0 | 0 | 5 | 0 | 0 |
| 43 | | NHiPro | 2 | 2 | 10 | 0 | 0 |
| 44 | | NiPro$_2$ | 5 | 0 | | | |
| 6 | 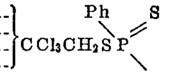 | OEt | 0 | 0 | 10 | 5 | 0 |
| 45 | | SEt | 0 | 0 | 0 | 0 | 0 |
| 46 | | NHiPro | 0 | 0 | 0 | 0 | 0 |
| 47 | | NiPro$_2$ | 0 | 0 | 0 | 0 | 0 |
| 48 | 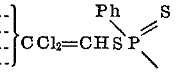 | OEt | 2 | 3 | | | |
| 12 | | SEt | 0 | 0 | 5 | 0 | 0 |
| 49 | | NHiPro | 4 | 4 | 0 | 0 | 0 |
| 50 | | NiPro$_2$ | 1 | 0 | | | |
| | Structure, additional compounds | | | | | | |
| 51 | $CCl_3CH_2S(CH_3)P(O)—SCH_3$ | | 7 | 0 | | | |
| 52 | $CCl_3CH_2S(CH_3)P(O)—SCH_3\ S(CH_2)_3CH_3$ | | 0 | 0 | | | |
| 1 | $CCl_3CH_2S(CH_3)P(O)—SCH_3\ O(2,4Cl_2)C_6H_3$ | | 1 | 0 | | | |
| 53 | $CCl_3CH_2S(CH_3)P(O)—SCH_3\ N(CH_3)C_6H_5$ | | 1 | 0 | | | |
| 54 | $[CCl_3CH_2S(C_2H_5)P(S)]_2$ 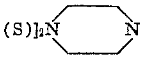 | | | | | | |
| 55 | $(Cl_3CH_2S(C_6H_5)P(O)—N(CH_3)_2$ | | 0 | 0 | | | |
| 56 | $CCl_3CH_2S(C_6H_5)P(O)—S(4Cl)C_6H_4$ | | 5 | 0 | | | |
| 57 | $CCl_3CH_2S(C_6H_5)P(O)—O(4Cl)C_6H_4$ | | 0 | 0 | | | |
| 58 | $CCl_3CH_2S(C_6H_5)P(O)—O(4NO_2)C_6H_4$ | | 1 | 0 | | | |
| 9 | $CCl_2{=}CHS(C_6H_5)P(O)—N(CH_3)_2$ | | 3 | 0 | | | |

The compounds were also tested as nematocides against both saprophytic and parasitic nematodes at the rates of test compound in parts per million (p.p.m.) set forth in Table 3. In the saprophytic nematode test (NESA) water was used as the medium with Panagrellus spp. and Rhabditis spp. The formulation employed included 50% of the compound being tested, 46% silica, 2% sodium lignin sulfonate and 2% Pluronic L-61 (polyethylene oxide, propylene oxide adduct molecular weight about 1000). This formulation is Formulation A. The results are given on a 0 to 10 scale with 10 indicating 100% kill and 0 indicating no kill after a 4-day incubation period.

In the parasitic nematode test (NEPA) the procedure was to add the test chemical in Formulation A to soil heavily infested with Meloidogyne spp. Then tomato plants were transplanted into the soil and allowed to grow. The root knots which formed on the roots of the plant were then measured according to a root knot index based on a 0–10 scale where 10 indicates complete absence of visible knotting and 0 indicates all roots were heavily infested (knotted). Tomato plants transplanted to the infested soil which did not contain the nematocide had an average root knot index of 0 while tomato plants transplanted to soil which had been steamed to kill all nematodes had an average root knot index of 10. The term "Ph" in Table 3 indicates phytotoxicity. As can be seen from Table 3 some of the compounds most effective against saprophytic nematodes had a considerably lesser effect against parasitic nematodes and vice versa. This is in accordance with the known fact that nematocide activity is not predictable.

TABLE 3

| Example | Structure, Me | | NESA 400 | 200 | 25 | NEPA 200 | 20 | 25 | 12.5 | 6 | 3 |
|---|---|---|---|---|---|---|---|---|---|---|---|
| 13 | 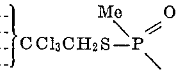 | OEt | 10 | 8 | 5 | 0 | 0 | | | | |
| 14 | | SEt | 10 | 10 | 10 | Ph | 0 | | | | |
| 15 | | NHiPro | 8 | 5 | 5 | | | | | | |
| 16 | | NiPro$_2$ | 1 | 1 | 1 | 0 | 0 | | | | |
| 17 | 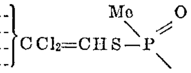 | OEt | 5 | 0 | 0 | 0 | 0 | | | | |
| 18 | | SEt | 10 | 10 | 3 | 0 | 0 | | | | |
| 7 | | NHiPro | 10 | 10 | 3 | | 0 | | | | |
| 19 | | NiPro$_2$ | 10 | 10 | 10 | (Ph) | (Ph) | | | | |
| 20 | 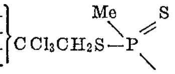 | OEt | 5 | 0 | 0 | (Ph) | 10 | (Ph) | 10 | 10 | 10 |
| 21 | | SEt | 0 | 0 | 0 | 10 | 10 | 10 | 10 | 10 | 8 |
| 4 | | NHiPro | 5 | 3 | 1 | 0 | 0 | | | | |
| 22 | | NiPro$_2$ | 1 | 1 | 1 | | | | | | |

TABLE 3—Continued

| Example | Structure, Me | | NESA 400 | NESA 200 | NESA 25 | NEPA 200 | NEPA 20 | NEPA 25 | NEPA 12.5 | NEPA 6 | NEPA 3 |
|---|---|---|---|---|---|---|---|---|---|---|---|
| 23 | 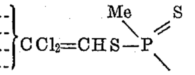 | OEt | 5 | 0 | 0 | Ph | 8 | | | | |
| 24 | | SEt | 1 | 1 | 1 | 10 | 10 | | | | |
| 10 | | NHiPro | 10 | 10 | 3 | | 10 | | | | |
| 25 | | NiPro2 | 5 | 1 | 1 | 0 | 0 | | | | |
| | Structure, Et | | | | | | | | | | |
| 26 | 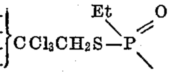 | OEt | 10 | 10 | 8 | (Ph) | 0 | | | | |
| 27 | | SEt | 10 | 10 | 8 | 0 | 0 | | | | |
| 2 | | NHiPro | 10 | 10 | 3 | 10 | 10 | 0 | 0 | | |
| 28 | | NiPro2 | 1 | 1 | 1 | 0 | 0 | | | | |
| 29 | 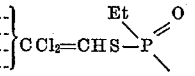 | OEt | | | | 9 | 0 | | | | |
| 8 | | SEt | 10 | 1 | 1 | 0 | 0 | | | | |
| 30 | | NHiPro | 10 | 1 | 1 | 0 | 0 | | | | |
| 31 | | NiPro2 | 8 | 8 | 8 | | | | | | |
| 32 | 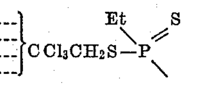 | OEt | | | | | | | | | |
| 33 | | SEt | 10 | 5 | 0 | 10 | 10 | 10 | 10 | 10 | 10 |
| 5 | | NHiPro | 5 | 3 | 1 | 0 | 0 | | | | |
| 34 | | NiPro2 | 1 | 1 | 1 | 0 | 0 | | | | |
| 35 | 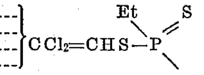 | OEt | 5 | 1 | 1 | Ph | 8 | | | | |
| 36 | | SEt | 5 | 1 | 1 | 10 | 10 | | | | |
| 11 | | NHiPro | 5 | 3 | 3 | 0 | 0 | | | | |
| 37 | | NiPro2 | 1 | 1 | 1 | 0 | 0 | | | | |
| | Structure, Ph | | | | | | | | | | |
| 38 | 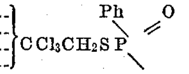 | OEt | 8 | 8 | 3 | 0 | 0 | | | | |
| 3 | | SEt | 5 | 1 | 1 | 0 | 0 | | | | |
| 39 | | NHiPro | 5 | 3 | 3 | 9 | 0 | | | | |
| 40 | | NiPro2 | 10 | 8 | 5 | 9 | 0 | | | | |
| 41 | 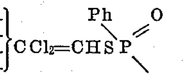 | OEt | 10 | 8 | 8 | Ph | 0 | | | | |
| 42 | | SEt | 10 | 5 | 5 | 0 | 0 | | | | |
| 43 | | NHiPro | 10 | 8 | 3 | 0 | 0 | | | | |
| 44 | | NiPro2 | 10 | 8 | 0 | Ph | 0 | | | | |
| 6 | 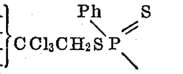 | OEt | 3 | 1 | 1 | 0 | 0 | | | | |
| 45 | | SEt | 1 | 1 | 1 | 0 | 0 | | | | |
| 46 | | NHiPro | 1 | 1 | 1 | 0 | 0 | | | | |
| 47 | | NiPro2 | 10 | 10 | 3 | 0 | 0 | | | | |
| 48 | 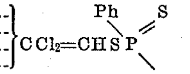 | OEt | 0 | 0 | 0 | 8 | 0 | | | | |
| 12 | | SEt | 3 | 3 | 1 | 0 | 0 | | | | |
| 49 | | NHiPro | 5 | 1 | 1 | 0 | 0 | | | | |
| 50 | | NiPro2 | 0 | 0 | 0 | 0 | 0 | | | | |
| | Structure, additional compounds | | | | | | | | | | |
| 51 | $CCl_3CH_2S(CH_3)P(O)-SCH_3$ | | 3 | 1 | 1 | 0 | 0 | | | | |
| 52 | $CCl_3CH_2S(CH_3)P(O)-S(CH_2)_3CH_3$ | | 5 | 1 | 1 | 0 | 0 | | | | |
| 1 | $CCl_3CH_2S(CH_3)P(O)-O(2,4Cl_2)C_6H_3$ | | 5 | 1 | 1 | 0 | 0 | | | | |
| 53 | $CCl_3CH_2S(CH_3)P(O)-N(CH_3)C_6H_5$ | | 5 | 1 | 1 | 0 | 0 | | | | |
| 54 | $[CCl_3CH_2S(C_2H_5)P(S)]_2$ 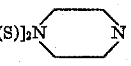 | | 3 | 1 | 1 | | | | | | |
| 55 | $(Cl_3CH_2S(C_6H_5)P(O)-N(CH_3)_2$ | | 8 | 5 | 1 | 0 | 0 | | | | |
| 56 | $CCl_3CH_2S(C_6H_5)P(O)-S(4Cl)C_6H_4$ | | 1 | 1 | 1 | 0 | 0 | | | | |
| 57 | $CCl_3CH_2S(C_6H_5)P(O)-O(4Cl)C_6H_4$ | | 3 | 1 | 1 | 0 | 0 | | | | |
| 58 | $CCl_3CH_2S(C_6H_5)P(O)-O(4NO_2)C_6H_4$ | | 1 | 1 | 1 | 0 | 0 | | | | |
| 9 | $CCl_2=CHS(C_6H_5)P(O)-N(CH_3)_2$ | | 8 | 5 | 5 | 0 | 0 | | | | |

The compounds were tested as pre-emergent and post-emergent herbicides at the indicated dosages in lbs./acre. The results are set forth in Table 4. In the pre-emergent tests the readings are on a 0–10 scale where 0 is no effect and 10 is complete inhibition of seeds to germinate and emerge. The compounds were applied in acetone solution in both the pre-emergent and post-emergent tests. In the post-emergent tests the readings are based on a 0–10 scale when 0 is no effect and 10 indicates all of the test plants were killed. Many of the compounds having good nematocide and/or fungicide activity had relatively low herbicidal effect which of course is desirable in order to kill pests without harming crops.

TABLE 4.—PLANT AT NUMBER 1A

| | | | Primary herbicides | | | | | | | | | | | | | | | | | | | | | | | |
|---|---|---|---|---|---|---|---|---|---|---|---|---|---|---|---|---|---|---|---|---|---|---|---|---|---|---|
| | | | Pig weed | | | | Wild Mustard | | | | Morning glory | | | | Japanese millet | | | | Water grass | | | | Wild oats | | | |
| | | | Pre | | Post | | Pre | | Post | | Pre | | Post | | Pre | | Post | | Pre | | Post | | Pre | | Post | |
| Example | Structure Me | | 15 | 5 | 8 | 2 | 15 | 5 | 8 | 2 | 15 | 5 | 8 | 2 | 15 | 5 | 8 | 2 | 15 | 5 | 8 | 2 | 15 | 5 | 8 | 2 |
| 13 | 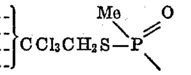 | OEt | 2 | 0 | 7 | 2 | 6 | 6 | 4 | 3 | 0 | 2 | 5 | 6 | 0 | 1 | 4 | 3 | 0 | 1 | 5 | 3 | 0 | 0 | 4 | 2 |
| 14 | | SEt | 0 | 0 | 5 | 3 | 9 | 7 | 4 | 3 | 2 | 0 | 7 | 5 | 1 | 0 | 3 | 3 | 1 | 0 | 4 | 3 | 0 | 0 | 3 | 1 |
| 15 | | NHiPro | 2 | 0 | 6 | 1 | 9 | 8 | 5 | 3 | 3 | 1 | 7 | 3 | 0 | 0 | 5 | 2 | 0 | 0 | 4 | 2 | 0 | 0 | 3 | 1 |
| 16 | | NiPro2 | | | | | | | | | | | | | | | | | | | | | | | | |
| 17 | 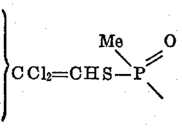 | OEt | 5 | 0 | 9 | 2 | 7 | 0 | 6 | 4 | 3 | 0 | 9 | 5 | 3 | 0 | 6 | 4 | 3 | 0 | 6 | 3 | 0 | 0 | 5 | 4 |
| | | | | | | | | | | | | | | | | | | | | | | | Sugar beets | | | |
| 18 | | SEt | 0 | 0 | 9 | 8 | 0 | 0 | 9 | 2 | 3 | 0 | 7 | 5 | 7 | 9 | 8 | 4 | | | | | 0 | 0 | 9 | 3 |
| 7 | | NHiPro | 4 | 2 | 9 | 3 | 3 | 3 | 6 | 2 | 0 | 0 | 5 | 4 | 5 | 2 | 3 | 3 | | | | | 0 | 0 | 3 | 0 |
| 19 | | NiPro2 | | | | | | | | | | | | | | | | | | | | | | | | |

TABLE 4—Continued

| | | | Primary herbicides 1 | | | | | | | | | | | | | | | | | | | | | | | |
|---|---|---|---|---|---|---|---|---|---|---|---|---|---|---|---|---|---|---|---|---|---|---|---|---|---|---|
| | | | Pig weed | | | | Wild Mustard | | | | Morning glory | | | | Japanese millet | | | | Water grass | | | | Wild oats | | | |
| | | | Pre | | Post | | Pre | | Post | | Pre | | Post | | Pre | | Post | | Pre | | Post | | Pre | | Post | |
| Example | Structure Me | | 15 | 5 | 8 | 2 | 15 | 5 | 8 | 2 | 15 | 5 | 8 | 2 | 15 | 5 | 8 | 2 | 15 | 5 | 8 | 2 | 15 | 5 | 8 | 2 |
| | | | | | | | | | | | | | | | | | | | | | | | Wild oats | | | |
| 20 | 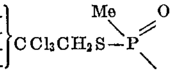 | OEt | 0 | 0 | 6 | 3 | 6 | 3 | 4 | 2 | 0 | 0 | 5 | 0 | 0 | 0 | 3 | 0 | 0 | 0 | 3 | 0 | 0 | 0 | 0 | 0 |
| 21 | | SEt | 3 | 0 | 0 | 0 | 5 | 0 | 2 | 1 | 3 | 0 | 5 | 2 | 2 | 0 | 5 | 1 | 2 | 0 | 4 | 1 | 2 | 0 | 1 | 0 |
| 4 | | NHiPro | 6 | 3 | 1 | 1 | 10 | 8 | 1 | 1 | 1 | 0 | 3 | 1 | 4 | 0 | 4 | 0 | 3 | 0 | 5 | 2 | 5 | 0 | 3 | 0 |
| 22 | | NiPro2 | -- | -- | -- | -- | -- | -- | -- | -- | -- | -- | -- | -- | -- | -- | -- | -- | -- | -- | -- | -- | -- | -- | -- | -- |
| 23 | 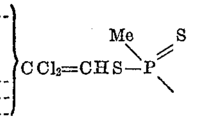 | OEt | 0 | 1 | 6 | 1 | 7 | 0 | 4 | 3 | 0 | 0 | 6 | 4 | 0 | 0 | 3 | 1 | 0 | 0 | 4 | 2 | 3 | 0 | 1 | 1 |
| | | | | | | | | | | | | | | | | | | | | | | | Sugar beets | | | |
| 24 | | SEt | 5 | 4 | 6 | 1 | 3 | 3 | 3 | 2 | 3 | 3 | 6 | 2 | 8 | 7 | 4 | 2 | -- | -- | -- | -- | 3 | 0 | 7 | 0 |
| 10 | | NHiPro | 7 | 3 | 10 | 3 | 3 | 3 | 6 | 3 | 0 | 0 | 9 | 6 | 0 | 0 | 6 | 4 | -- | -- | -- | -- | 0 | 0 | 9 | 2 |
| 25 | | NiPro2 | -- | -- | -- | -- | -- | -- | -- | -- | -- | -- | -- | -- | -- | -- | -- | -- | -- | -- | -- | -- | -- | -- | -- | -- |
| | Structure, Et | | | | | | | | | | | | | | | | | | | | | | | | | |
| | | | | | | | | | | | | | | | | | | | | | | | Wild oats | | | |
| 26 | 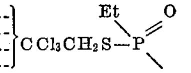 | OEt | -- | -- | -- | -- | -- | -- | -- | -- | -- | -- | -- | -- | -- | -- | -- | -- | -- | -- | -- | -- | -- | -- | -- | -- |
| 27 | | SEt | 3 | 0 | 7 | 6 | 8 | 0 | 6 | 3 | 0 | 0 | 8 | 5 | 0 | 0 | 5 | 4 | 0 | 0 | 6 | 3 | 0 | 0 | 5 | 2 |
| 2 | | NHiPro | 3 | 2 | 4 | 3 | 9 | 9 | 3 | 1 | 2 | 0 | 4 | 1 | 0 | 0 | 4 | 2 | 1 | 0 | 5 | 3 | 1 | 0 | 1 | 1 |
| 28 | | NiPro2 | -- | -- | -- | -- | -- | -- | -- | -- | -- | -- | -- | -- | -- | -- | -- | -- | -- | -- | -- | -- | -- | -- | -- | -- |
| 29 | 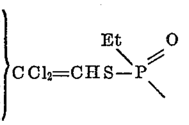 | OEt | 3 | 3 | 9 | 5 | 7 | 6 | 6 | 4 | 3 | 4 | 8 | 8 | 3 | 4 | 5 | 3 | 3 | 4 | 6 | 4 | 0 | 0 | 6 | 3 |
| | | | | | | | | | | | | | | | | | | | | | | | Sugar beets | | | |
| 8 | | SEt | 0 | 0 | 10 | 10 | 0 | 0 | 10 | 10 | -- | -- | -- | -- | 0 | 0 | 5 | 5 | 5 | 0 | 7 | 5 | 0 | 0 | 10 | 10 |
| 30 | | NHiPro | 0 | 0 | 10 | 9 | 0 | 0 | 6 | 6 | -- | -- | -- | -- | 0 | 0 | 7 | 5 | 0 | 0 | 5 | 5 | 0 | 0 | 10 | 5 |
| 31 | | NiPro2 | -- | -- | -- | -- | -- | -- | -- | -- | -- | -- | -- | -- | -- | -- | -- | -- | -- | -- | -- | -- | -- | -- | -- | -- |
| | | | | | | | | | | | | | | | | | | | | | | | Wild oats | | | |
| 32 | 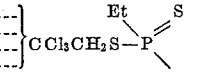 | OEt | 8 | 7 | 0 | 1 | 7 | 8 | 2 | 3 | 1 | 0 | 3 | 2 | 0 | 0 | 1 | 2 | 0 | 0 | 0 | 2 | 0 | 0 | 0 | 0 |
| 33 | | SEt | 6 | 0 | 3 | 1 | 1 | 1 | 4 | 3 | 1 | 1 | 3 | 1 | 4 | 0 | 4 | 0 | 6 | 0 | 4 | 0 | 2 | 0 | 3 | 0 |
| 5 | | NHiPro | 2 | 0 | 2 | 0 | 8 | 5 | 2 | 1 | 1 | 0 | 4 | 1 | 2 | 0 | 3 | 2 | 2 | 0 | 4 | 3 | 3 | 0 | 2 | 1 |
| 34 | | NiPro2 | 0 | 0 | 7 | 7 | 0 | 0 | 6 | 6 | 0 | 1 | 7 | 7 | 0 | 0 | 4 | 3 | 0 | 0 | 6 | 3 | 0 | 2 | 1 | 1 |
| 35 | 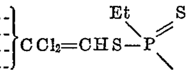 | OEt | 0 | 0 | 6 | 3 | 6 | 6 | 5 | 4 | 5 | 1 | 7 | 7 | 0 | 0 | 3 | 2 | 0 | 0 | 4 | 4 | 5 | 6 | 4 | 1 |
| 36 | | SEt | 7 | 2 | 3 | 1 | 3 | 2 | 5 | 3 | 5 | 3 | 4 | 4 | 4 | 3 | 2 | 2 | 3 | 3 | 3 | 2 | 5 | 6 | 0 | 0 |
| 11 | | NHiPro | 7 | 4 | 5 | 4 | 6 | 0 | 3 | 2 | 1 | 0 | 5 | 4 | 8 | 0 | 5 | 4 | 9 | 0 | 6 | 5 | 1 | 0 | 5 | 1 |
| 37 | | NiPro2 | 0 | 0 | 6 | 1 | 0 | 0 | 6 | 3 | 0 | 0 | 8 | 5 | 0 | 0 | 5 | 2 | 0 | 0 | 6 | 2 | 0 | 0 | 4 | 0 |
| | Structure, Ph | | | | | | | | | | | | | | | | | | | | | | | | | |
| | | | Sugar beets | | | | Radish | | | | Flax | | | | Wheat | | | | | | | | | | | |
| 38 | 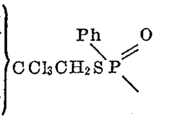 | OEt | 0 | 0 | 9 | 3 | 0 | 0 | 8 | 4 | 0 | 0 | 6 | 3 | 0 | 0 | 6 | 2 | -- | -- | -- | -- | 3 | 3 | 6 | 1 |
| 3 | | SEt | 0 | 0 | 8 | 3 | 0 | 0 | 7 | 3 | 0 | 0 | 4 | 2 | 0 | 0 | 3 | 1 | -- | -- | -- | -- | 0 | 0 | 4 | 0 |
| | | | Pigweed | | | | Wild Mustard | | | | Morning glory | | | | Japanese millet | | | | | | | | | | | |
| 39 | | NHiPro | 0 | 0 | 0 | 0 | 0 | 0 | 1 | 1 | 3 | 0 | 1 | 1 | 1 | 0 | 0 | 0 | 1 | 0 | 0 | 0 | 0 | 0 | 0 | 0 |
| 40 | | NiPro | -- | -- | -- | -- | -- | -- | -- | -- | -- | -- | -- | -- | -- | -- | -- | -- | -- | -- | -- | -- | -- | -- | -- | -- |
| 41 | 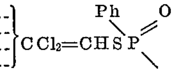 | OEt | 0 | 0 | 8 | 3 | 0 | 0 | 7 | 3 | 0 | 0 | 9 | 4 | 0 | 0 | 7 | 3 | 0 | 0 | 6 | 3 | 0 | 0 | 1 | 0 |
| 42 | | SEt | 0 | 0 | 3 | 0 | 0 | 0 | 2 | 1 | 0 | 0 | 4 | 3 | 0 | 0 | 4 | 2 | 0 | 0 | 4 | 3 | 0 | 0 | 0 | 0 |
| 43 | | NHiPro | 0 | 0 | 3 | 0 | 0 | 0 | 2 | 0 | 0 | 0 | 4 | 1 | 0 | 0 | 2 | 1 | 0 | 0 | 2 | 2 | 0 | 0 | 1 | 1 |
| 44 | | NiPro2 | 0 | 0 | 30 | 0 | 0 | 0 | 3 | 4 | 0 | 0 | 5 | 3 | 0 | 0 | 4 | 0 | 0 | 0 | 3 | 0 | 0 | 0 | 0 | 0 |
| 6 | 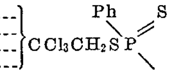 | OEt | 0 | 0 | 0 | 0 | 0 | 0 | 2 | 2 | 0 | 0 | 1 | 2 | 0 | 0 | 0 | 0 | 0 | 0 | 0 | 0 | 0 | 0 | 0 | 0 |
| 45 | | SEt | 0 | 0 | 4 | 3 | 0 | 0 | 3 | 1 | 0 | 0 | 5 | 3 | 0 | 0 | 3 | 3 | 0 | 0 | 3 | 2 | 0 | 0 | 1 | 0 |
| 46 | | NHiPro | 0 | 0 | 0 | 0 | 0 | 0 | 2 | 2 | 0 | 0 | 1 | 2 | 0 | 0 | 0 | 0 | 0 | 0 | 0 | 0 | 0 | 0 | 0 | 0 |
| 47 | | NiPro2 | 0 | 0 | 1 | 0 | 0 | 0 | 1 | 1 | 0 | 0 | 1 | 2 | 0 | 0 | 0 | 0 | 0 | 0 | 1 | 0 | 0 | 0 | 0 | 0 |
| 48 | 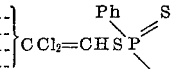 | OEt | 6 | 0 | 3 | 2 | 0 | 0 | 4 | 2 | 0 | 0 | 5 | 1 | 0 | 0 | 4 | 1 | 0 | 0 | 4 | 1 | 0 | 0 | 3 | 0 |
| 12 | | SEt | 0 | 0 | 2 | 1 | 0 | 0 | 2 | 1 | 0 | 0 | 4 | 3 | 0 | 0 | 4 | 3 | 0 | 0 | 6 | 3 | 0 | 0 | 1 | 0 |
| 49 | | NHiPro | 1 | 0 | 2 | 1 | 0 | 0 | 1 | 1 | 1 | 0 | 2 | 1 | 0 | 0 | 2 | 1 | 0 | 0 | 4 | 3 | 0 | 0 | 4 | 1 |
| 50 | | NiPro2 | 2 | 0 | 5 | 3 | 9 | 0 | 4 | 4 | 3 | 0 | 6 | 3 | 0 | 0 | 3 | 2 | 0 | 0 | 4 | 2 | 0 | 0 | 1 | 0 |

| | | Primary herbicides | | | | | | | | | | | | | | | | | | | |
|---|---|---|---|---|---|---|---|---|---|---|---|---|---|---|---|---|---|---|---|---|---|
| | | Sugar beets | | | | Radish | | | | Flax | | | | Wheat | | | | Oats | | | |
| | | Pre | | Post | | Pre | | Post | | Pre | | Post | | Pre | | Post | | Pre | | Post | |
| Ex. | Structure, additional compounds | 15 | 5 | 8 | 2 | 15 | 5 | 8 | 2 | 15 | 5 | 8 | 2 | 15 | 5 | 8 | 2 | 15 | 5 | 8 | 2 |
| 51 | $CCl_3CH_2S(CH_3)P(O)-SCH_3$ | 0 | 0 | 8 | 3 | 1 | 0 | 7 | 3 | 3 | 0 | 6 | 3 | 1 | 0 | 3 | 0 | 2 | 0 | 5 | 1 |
| 52 | $CCl_3CH_2S(CH_3)P(O)-S(CH_2)_3CH_3$ | 0 | 0 | 9 | 6 | 0 | 0 | 8 | 5 | 0 | 0 | 7 | 3 | 0 | 0 | 5 | 3 | 0 | 0 | 6 | 1 |
| 1 | $CCl_3CH_2S(CH_3)P(O)-O(2,4Cl_2)C_6H_3$ | 0 | 0 | 2 | 1 | 0 | 0 | 3 | 3 | 0 | 0 | 3 | 1 | 0 | 0 | 0 | 0 | 0 | 0 | 1 | 0 |
| 53 | $CCl_3CH_2S(CH_3)P(O)-N(CH_3)C_6H_5$ | 0 | 0 | 9 | 5 | 0 | 0 | 9 | 3 | 0 | 0 | 8 | 2 | 0 | 0 | 6 | 3 | 0 | 0 | 6 | 0 |
| 54 | $[CCl_3CH_2S(C_2H_5)P(S)]_2$N  N | -- | -- | -- | -- | -- | -- | -- | -- | -- | -- | -- | -- | -- | -- | -- | -- | -- | -- | -- | -- |
| 55 | $CCl_3CH_2S(C_6H_5)P(O)-N(CH_3)_2$ | 3 | 0 | 8 | 6 | 4 | 0 | 8 | 4 | 3 | 0 | 6 | 3 | 3 | 0 | 4 | 1 | 3 | 2 | 6 | 2 |
| 56 | $CCl_3CH_2S(C_6H_5)P(O)-S(4Cl)C_6H_4$ | 0 | 0 | 7 | 2 | 0 | 0 | 7 | 2 | 0 | 0 | 4 | 2 | 0 | 0 | 0 | 0 | 0 | 0 | 2 | 0 |
| 57 | $CCl_3CH_2S(C_6H_5)P(O)-O(4Cl)C_6H_4$ | 0 | 0 | 0 | 0 | 0 | 0 | 5 | 3 | 2 | 0 | 3 | 3 | 0 | 0 | 2 | 1 | 0 | 0 | 0 | 0 |
| 58 | $CCl_3CH_2S(C_6H_5)P(O)-O(4NO_2)C_6H_4$ | 5 | 0 | 4 | 1 | 0 | 0 | 4 | 2 | 0 | 0 | 2 | 0 | 0 | 0 | 1 | 0 | 0 | 0 | 0 | 0 |
| 9 | $CCl_2=CHS(C_6H_5)P(O)-N(CH_3)_2$ | -- | -- | 4 | 2 | -- | -- | 3 | 3 | -- | -- | 6 | 3 | -- | -- | 6 | 3 | -- | -- | 7 | 4 |

The compounds were also tested as defoliants and desiccants at the indicated dosages in lbs./acre. The results are set forth in Table 5. The compounds in acetone solution were sprayed on cotton plants in the squaring stage of development. Defoliation was determined after 7 days and is based on a 0–10 scale where 0 is no effect and 10 indicates 100% defoliation. Desiccation is also after 7 days and is based on a 0–10 scale where 0 indicates no effect and 10 indicates complete desiccation.

Regrowth also measured on Table 5 was determined 5 days after the defoliation data was recorded and is also on a 0 to 10 scale where 0 is no control and 10 is completed control of regrowth. The compounds of the present invention had only slight defoliation and desiccation properties and no control of regrowth. This of course is desirable in pesticides applied to growing crops.

TABLE 5.—AT NUMBER 1A

| | | | Defoliant-desiccant | | | | | | | | | | | |
|---|---|---|---|---|---|---|---|---|---|---|---|---|---|---|
| | | | Defoliant | | | | Desiccant | | | | Regrowth | | | |
| Example | Structure, Me | | 8 | 4 | 2 | 1 | 8 | 4 | 2 | 1 | 8 | 4 | 2 | 1 |
| 13 | 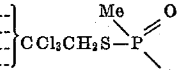 | OEt | | 0 | 0 | 0 | | 1 | 1 | 0 | | 0 | 0 | 0 |
| 14 | | SEt | | 2 | 0 | 0 | | 3 | 3 | 2 | | 0 | 0 | 0 |
| 15 | | NHiPro | | 0 | 0 | 0 | | 5 | 3 | 2 | | 0 | 0 | 0 |
| 16 | | NiPro₂ | | | | | | | | | | | | |
| 17 | 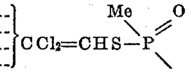 | OEt | | 0 | 0 | 0 | | 7 | 5 | 4 | | 0 | 0 | 0 |
| 18 | | SEt | | 3 | 4 | 0 | | 1 | 2 | 0 | | 0 | 0 | 0 |
| 7 | | NHiPro | | | | | | | | | | | | |
| 19 | | NiPro₂ | | | | | | | | | | | | |
| 20 | 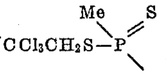 | OEt | | 0 | 0 | 0 | | 1 | 0 | 0 | | 0 | 0 | 0 |
| 21 | | SEt | | 0 | 0 | 0 | | 1 | 1 | 1 | | 0 | 0 | 0 |
| 4 | | NHiPro | | 10 | 0 | 0 | | 3 | 2 | 1 | | 0 | 0 | 0 |
| 22 | | NiPro₂ | | | | | | | | | | | | |
| 23 | 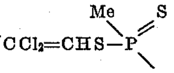 | OEt | | 0 | 0 | 0 | | 4 | 2 | 1 | | 0 | 0 | 0 |
| 24 | | SEt | | | | | | | | | | | | |
| 10 | | NHiPro | | 0 | 0 | 0 | | 3 | 2 | 1 | | 0 | 0 | 0 |
| 25 | | NiPro₂ | | | | | | | | | | | | |
| | Structure, Et | | | | | | | | | | | | | |
| 26 | 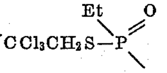 | OEt | | | | | | | | | | | | |
| 27 | | SEt | | 0 | 0 | 0 | | 4 | 3 | 2 | | 0 | 0 | 0 |
| 2 | | NHiPro | | 0 | 0 | 0 | | 3 | 3 | 1 | | 0 | 0 | 0 |
| 28 | | NiPro₂ | | | | | | | | | | | | |
| 29 | 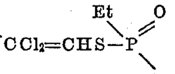 | OEt | | 0 | 0 | 0 | | 4 | 3 | 2 | | 0 | 0 | 0 |
| 8 | | SEt | | 1 | 3 | 0 | | 3 | 4 | 2 | | | | |
| 30 | | NHiPro | | 0 | 0 | 0 | | 2 | 2 | 1 | | | | |
| 31 | | NiPro₂ | | | | | | | | | | | | |
| 32 | 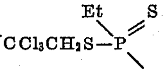 | OEt | | | | | | | | | | | | |
| 33 | | SEt | | 0 | 0 | 0 | | 2 | 2 | 2 | | 0 | 0 | 0 |
| 5 | | NHiPro | | 0 | 0 | 0 | | 2 | 1 | 1 | | 0 | 0 | 0 |
| 34 | | NiPro₂ | | 0 | 0 | 0 | | 4 | 3 | 1 | | 0 | 0 | 0 |
| 35 | 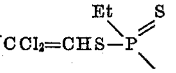 | OEt | | 0 | 0 | 0 | | 3 | 3 | 2 | | 0 | 0 | 0 |
| 36 | | SEt | | 0 | 0 | 0 | | 2 | 1 | 1 | | 0 | 0 | 0 |
| 11 | | NHiPro | | 20 | 0 | 0 | | 3 | 1 | 1 | | 0 | 0 | 0 |
| 37 | | NiPro₂ | | 0 | 0 | 0 | | 4 | 1 | 1 | | 0 | 0 | 0 |
| | Structure, Ph | | | | | | | | | | | | | |
| 38 | 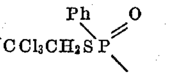 | OEt | 0 | | 0 | | 2 | | 1 | | | | | |
| 3 | | SEt | 0 | | 0 | | 1 | | 1 | | | | | |
| 39 | | NHiPro | | 0 | 0 | 0 | | 1 | 0 | 0 | | 0 | 0 | 0 |
| 40 | | NiPro₂ | | | | | | | | | | | | |
| 41 | 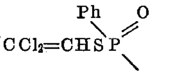 | OEt | | 0 | 0 | 0 | | 3 | 2 | 2 | | 0 | 0 | 0 |
| 42 | | SEt | | 4 | 0 | 0 | | 4 | 4 | 3 | | 2 | 0 | 0 |
| 43 | | NHiPro | | 0 | 0 | 0 | | 3 | 3 | 1 | | 0 | 0 | 0 |
| 44 | | NiPro₂ | | 0 | 0 | 0 | | 2 | 1 | 1 | | 0 | 0 | 0 |
| 6 | 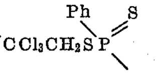 | OEt | | 0 | 0 | 0 | | 2 | 1 | 2 | | 0 | 0 | 0 |
| 45 | | SEt | | 0 | 0 | 0 | | 1 | 1 | 1 | | 0 | 0 | 0 |
| 46 | | NHiPro | | 0 | 0 | 0 | | 2 | 2 | 1 | | 0 | 0 | 0 |
| 47 | | NiPro₂ | | 0 | 0 | 0 | | 1 | 1 | 1 | | 0 | 0 | 0 |
| 48 | 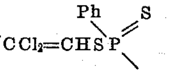 | OEt | | 0 | 0 | 0 | | 2 | 2 | 2 | | 0 | 0 | 0 |
| 12 | | SEt | | 0 | 0 | 0 | | 2 | 1 | 1 | | 0 | 0 | 0 |
| 49 | | NHiPro | | 0 | 0 | 0 | | 1 | 1 | 1 | | 0 | 0 | 0 |
| 50 | | NiPro₂ | | 0 | 0 | 0 | | 4 | 2 | 2 | | 0 | 0 | 0 |
| | Structure, additional compounds | | | | | | | | | | | | | |
| 51 | $CCl_3CH_2S(CH_3)P(O)—SCH_3$ | | 0 | | 0 | | | | 4 | | | | | |
| 52 | $CCl_3CH_2S(CH_3)P(O)—S(CH_2)_3CH_3$ | | 0 | | 0 | | | | 6 | | | | | |
| 1 | $CCl_3CH_2S(CH_3)P(O)—O(2,4Cl_2)C_6H_3$ | | 0 | | 0 | | 3 | | 2 | | | | | |
| 53 | $CCl_3CH_2S(CH_3)P(O)—N(CH_3)C_6H_5$ | | 0 | | 0 | | 2 | | 1 | | | | | |
| 54 | 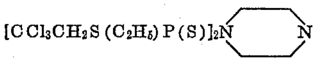 | | | | | | | | | | | | | |
| 55 | $(Cl_3CH_2S(C_6H_5)P(O)—N(CH_3)_2$ | | 1 | | 0 | | 3 | | 2 | | | | | |
| 56 | $CCl_3CH_2S(C_6H_5)P(O)—S(4Cl)C_6H_4$ | | 0 | | 0 | | 1 | | 0 | | | | | |
| 57 | $CCl_3CH_2S(C_6H_5)P(O)—O(4Cl)C_6H_4$ | | 0 | | 0 | | 0 | | 0 | | | | | |
| 58 | $CCl_3CH_2S(C_6H_5)P(O)—O(4NO_2)C_6H_4$ | | 0 | | 0 | | 0 | | 0 | | | | | |
| 9 | $CCl_2{=}CHS(C_6H_5)P(O)—N(CH_3)_2$ | | 0 | | 0 | | 6 | | 6 | | | | | |

Additionally the compounds were tested as insecticides as shown in Table 6. In the table the rates are in mmg. (micrograms)/dish. The results are indicated after 2 hours and 18 hours for the flour beetle and the housefiy. A number of the compounds were very effective as is indicated by the results on the scale where 0 is no kill and 10 is 100% kill.

The compounds having a P=S linkage on the whole appear to be better pesticides than the compounds having a P=O linkage.

In the tests reported in the tables, the most useful compounds were 2,2-dichlorovinyl-S-ethyl methyl thiophosphonate (nematocide and to a lesser extent soil fungicide); S-2,2,2-trichloroethyl ethyl phosphon monoisopropyl ami- TABLE 6.—INSECTICIDES
[Rates at mmg. dish]

| Example | Structure, Me | | Flour beetles 2 hrs. 1,000 | 100 | 10 | Flour beetles 18 hrs. 1,000 | 100 | 10 | House fly 2 hrs. 1,000 | 100 | 10 | House fly 18 hrs. 1,000 | 100 | 10 |
|---|---|---|---|---|---|---|---|---|---|---|---|---|---|---|
| 13 | 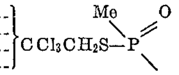 | OEt | 53 | | | 100 | | | 100 | | | 100 | | |
| 14 | | SEt | 96 | | | 100 | | | 100 | | | 100 | | |
| 15 | | NHiPro | 66 | 0 | 0 | 93 | 10 | 0 | 100 | 16 | 0 | 100 | 96 | 6 |
| 16 | | NiPro₂ | 6 | | | 30 | | | 0 | | | 100 | | |
| 17 | 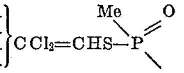 | OEt | 100 | | | 100 | | | 100 | | | 100 | | |
| 18 | | SEt | | | | | | | | | | | | |
| 7 | | NHiPro | | | | | | | | | | | | |
| 19 | | NiPro₂ | 30 | 0 | 0 | 80 | 3 | 0 | 53 | 0 | 0 | 80 | 3 | 13 |
| 20 | 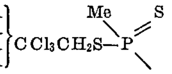 | OEt | | | | | | | | | | | | |
| 21 | | SEt | | | | | | | | | | | | |
| 4 | | NHiPro | 3 | 0 | 0 | 100 | 70 | 3 | 83 | 13 | 3 | 100 | 100 | 23 |
| 22 | | NiPro₂ | 3 | 0 | 0 | 13 | 0 | 0 | 3 | 3 | 3 | 33 | 20 | 6 |
| 23 | 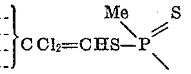 | OEt | | | | | | | | | | | | |
| 24 | | SEt | | | | | | | | | | | | |
| 10 | | NHiPro | | | | | | | | | | | | |
| 25 | | NiPro₂ | 16 | | | 66 | | | 6 | | | 96 | | |
| | Structure, Et | | | | | | | | | | | | | |
| 26 | 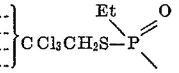 | OEt | 96 | | | 100 | | | 100 | | | 100 | | |
| 27 | | SEt | 80 | | | 100 | | | 100 | | | 100 | | |
| 2 | | NHiPro | | | | | | | | | | | | |
| 28 | | NiPro₂ | 0 | | | 3 | | | 0 | | | 96 | | |
| 29 | 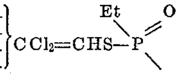 | OEt | 100 | | | 100 | | | 100 | | | 100 | | |
| 8 | | SEt | | | | | | | | | | | | |
| 30 | | NHiPro | | | | | | | | | | | | |
| 31 | | NiPro₂ | 0 | 0 | 0 | 23 | 16 | 3 | 3 | 3 | 0 | 33 | 16 | 13 |
| 32 | 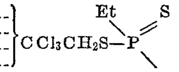 | OEt | | | | | | | | | | | | |
| 33 | | SEt | | | | | | | | | | | | |
| 5 | | NHiPro | 0 | 0 | 0 | 100 | 80 | 3 | 96 | 33 | 0 | 100 | 100 | 90 |
| 34 | | NiPro₂ | 13 | | | 70 | | | 10 | | | 100 | | |
| 35 | 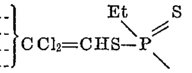 | OEt | | | | | | | | | | | | |
| 36 | | SEt | | | | | | | | | | | | |
| 11 | | NHiPro | 33 | 0 | 0 | 100 | 43 | 0 | 100 | 93 | 10 | 100 | 100 | 93 |
| 37 | | NiPro₂ | 0 | 0 | 0 | 23 | 16 | 6 | 3 | 0 | 0 | 23 | 20 | 13 |
| | Structure, Ph | | | | | | | | | | | | | |
| 38 | 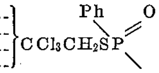 | OEt | 70 | 0 | 0 | 100 | 80 | 0 | 0 | 0 | 0 | 80 | 0 | 0 |
| 3 | | SEt | 0 | 0 | 0 | 37 | 0 | 0 | 0 | 0 | 0 | 0 | 0 | 0 |
| 39 | | NHiPro | 0 | 0 | 0 | 0 | 0 | 0 | 10 | 10 | 16 | 23 | 20 | 13 |
| 40 | | NiPro₂ | 0 | 0 | 0 | 0 | 0 | 0 | 6 | 3 | 0 | 50 | 30 | 30 |
| 41 | 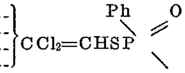 | OEt | 3 | 0 | 0 | 13 | 0 | 0 | 50 | 0 | 0 | 100 | 23 | 10 |
| 42 | | SEt | | | | | | | | | | | | |
| 43 | | NHiPro | 0 | 0 | 0 | 0 | 0 | 0 | 0 | 0 | 0 | 36 | 30 | 13 |
| 44 | | NiPro₂ | 0 | 0 | 0 | 6 | 0 | 0 | 0 | 0 | 0 | 10 | 6 | 3 |
| 6 | 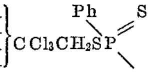 | OEt | 6 | 0 | 0 | 83 | 0 | 0 | 0 | 0 | 0 | 100 | 96 | 50 |
| 45 | | SEt | 0 | 0 | 0 | 66 | 6 | 0 | 0 | 0 | 0 | 40 | 26 | 20 |
| 46 | | NHiPro | 3 | 3 | 0 | 16 | 6 | 0 | 0 | 0 | 0 | 100 | 46 | 30 |
| 47 | | NiPro₂ | 0 | 0 | 0 | 0 | 0 | 0 | 0 | 0 | 0 | 30 | 16 | 13 |
| 48 | 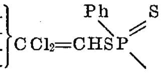 | OEt | 3 | 0 | 0 | 33 | 3 | 0 | 3 | 6 | 0 | 100 | 16 | 13 |
| 12 | | SEt | 0 | 0 | 0 | 63 | 0 | 0 | 3 | 0 | 0 | 46 | 10 | 3 |
| 49 | | NHiPro | 0 | 0 | 0 | 0 | 0 | 0 | 0 | 0 | 0 | 36 | 26 | 10 |
| 50 | | NiPro₂ | 0 | 0 | 0 | 13 | 0 | 0 | 3 | 3 | 0 | 13 | 10 | 13 |
| | Structure, additional compounds | | | | | | | | | | | | | |
| 51 | $CCl_3CH_2S(CH_3)P(O)-SCH_3$ | | 100 | 0 | 0 | 100 | 0 | 0 | 100 | 30 | 0 | 100 | 75 | 10 |
| 52 | $CCl_3CH_2S(CH_3)P(O)-S(CH_2)_3CH_3$ | | 75 | 15 | 0 | 100 | 100 | 0 | 100 | 5 | 0 | 100 | 5 | 0 |
| 1 | $CCl_3CH_2S(CH_3)P(O)-O(2,4Cl_2)C_6H_3$ | | 6 | 3 | 0 | 100 | 100 | 0 | 0 | 0 | 0 | 0 | 0 | 0 |
| 53 | $CCl_3CH_2S(CH_3)P(O)-N(CH_3)C_6H_5$ | | 0 | 0 | 0 | 50 | 0 | 0 | 0 | 0 | 0 | 0 | 0 | 0 |
| 54 | $[CCl_3CH_2S(C_2H_5)P(S)]_2$ 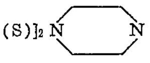 | | | | | | | | | | | | | |
| 55 | $CCl_3CH_2S(C_6H_5)P(O)-N(CH_3)_2$ | | 30 | 0 | 0 | 70 | 0 | 0 | 0 | 0 | 0 | 25 | 10 | 0 |
| 56 | $CCl_3CH_2S(C_6H_5)P(O)-S(4Cl)C_6H_4$ | | 0 | 0 | 0 | 35 | 0 | 0 | 0 | 0 | 0 | 5 | 0 | 0 |
| 57 | $CCl_3CH_2S(C_6H_5)P(O)-O(4Cl)C_6H_4$ | | 50 | 0 | 0 | 50 | 0 | 0 | 0 | 0 | 0 | 0 | 0 | 0 |
| 58 | $CCl_3CH_2S(C_6H_5)P(O)-O(4NO_2)C_6H_4$ | | 0 | 0 | 0 | 0 | 0 | 0 | 0 | 0 | 0 | 0 | 0 | 0 |
| 9 | $CCl_2=CHS(C_6H_5)P(O)-N(CH_3)_2$ | | 0 | 0 | 0 | 10 | 0 | 0 | 0 | 0 | 0 | 5 | 0 | 0 |

The general observations from the tests are that the areas of activity of the series of compounds tested appears to be in the order nematocidal, insecticidal and fungicidal in the given order of priority.

The compounds where $R_2$ is lower alkyl, e.g. methyl or ethyl appear to be superior pesticides to those where $R_2$ is phenyl.

date (soil fungicide and to a lesser extent saprophytic nematocide); S-2,2,2-trichloroethyl-O-ethyl methyl thiophosphonate (namatocide); S-2,2,2-trichloroethyl-S-ethyl methyl thiophosphonate (nematocide); S-2,2,2-trichloroethyl-S-ethyl ethyl thiophosphonate (nematocide); S-2,2,2-trichloroethyl methyl thiophosphon monoisopropyl amidate (insecticide); S-2,2,2-trichloroethyl ethyl thiophosphon monoisopropyl amidate (insecticide and to a lesser extent saprophytic nematocide); S-2,2,2-dichlorovinyl-ethyl thiophosphon monoisopropyl amidate (insecticide and to a lesser extent parasitic nematocide and plate fungicide); and S-2,2,2-dichlorovinyl ethyl thiophosphon monoisopropyl amidate (soil fungicide).

What is claimed is:

1. A method of killing nematodes comprising applying to the nematodes a nematocidally effective amount of a compound having the formula

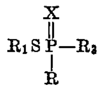

where $R_1$ is trichloroethyl or dichlorovinyl, $R_2$ is lower alkyl or phenyl, $R_3$ is

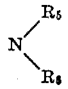

where $R_5$ is lower alkyl, phenyl, naphthyl, tolyl, chlorophenyl or bromophenyl; $R_6$ is hydrogen or $R_5$; and X is O or S.

2. A process according to claim 1 wherein $R_1$ is 2,2,2-trichloroethyl.

3. A process according to claim 1 wherein $R_1$ is 2,2-dichlorovinyl.

4. A process according to claim 1 wherein $R_5$ is lower alkyl and $R_6$ is hydrogen or lower alkyl.

5. A process according to claim 4 wherein $R_6$ is hydrogen.

6. A process according to claim 4 wherein X is O.

7. A process according to claim 4 wherein X is S.

8. A method of killing insects comprising applying to the insects an insecticidally effective amount of a compound having the formula

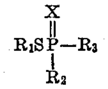

where $R_1$ is trichloroethyl or dichlorovinyl, $R_2$ is lower alkyl or phenyl, $R_3$ is

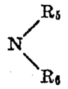

where $R_5$ is lower alkyl, phenyl, naphthyl, tolyl, chlorophenyl or bromophenyl; $R_6$ is hydrogen or $R_5$; and X is O or S.

9. A method of killing fungi comprising applying to the fungi a fungicidally effective amount of a compound having the formula.

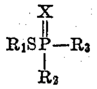

where $R_1$ is trichloroethyl or dichlorovinyl, $R_2$ is lower alkyl or phenyl, $R_3$ is

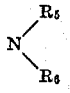

where $R_5$ is lower alkyl, phenyl, naphthyl, tolyl, chlorophenyl or bromophenyl; $R_6$ is hydrogen or $R_5$; and X is O or S.

References Cited

UNITED STATES PATENTS 3,093,536 6/1963 Loeffer ---------- 260—957 X

JEROME D. GOLDBERG, Primary Examiner

A. J. ROBINSON, Assistant Examiner

U.S. Cl. X.R.

424—219, 222